(12) United States Patent
Akenine-Moller et al.

(10) Patent No.: US 11,321,902 B2
(45) Date of Patent: May 3, 2022

(54) APPARATUS AND METHOD FOR OPTIMIZED RAY TRACING

(71) Applicant: INTEL CORPORATION, Santa Clara, CA (US)

(72) Inventors: Tomas G. Akenine-Moller, Lund (SE); Ingo Wald, Salt Lake City, UT (US)

(73) Assignee: INTEL CORPORATION, Santa Clara, CA (US)

(*) Notice: Subject to any disclaimer, the term of this patent is extended or adjusted under 35 U.S.C. 154(b) by 148 days.

(21) Appl. No.: 16/804,379

(22) Filed: Feb. 28, 2020

(65) Prior Publication Data

US 2020/0202606 A1    Jun. 25, 2020

Related U.S. Application Data

(62) Division of application No. 15/268,498, filed on Sep. 16, 2016, now Pat. No. 10,580,189.

(51) Int. Cl.
| | |
|---|---|
| *G06T 15/00* | (2011.01) |
| *G06T 1/20* | (2006.01) |
| *G06T 15/06* | (2011.01) |
| *G06T 15/80* | (2011.01) |

(52) U.S. Cl.
CPC .......... *G06T 15/005* (2013.01); *G06T 1/20* (2013.01); *G06T 15/06* (2013.01); *G06T 15/80* (2013.01)

(58) Field of Classification Search
CPC .......... G06T 1/20; G06T 1/60; G06T 15/005; G06T 15/06; G06T 15/80; G06F 9/3816; G06F 12/0862
See application file for complete search history.

(56) References Cited

U.S. PATENT DOCUMENTS

| | | | |
|---|---|---|---|
| 7,688,320 B2 | 3/2010 | Shearer | |
| 9,632,936 B1 | 4/2017 | Zuckerman et al. | |
| 2003/0188143 A1* | 10/2003 | Sheaffer | G08G 1/16 |
| | | | 382/103 |
| 2007/0239940 A1 | 10/2007 | Doshi et al. | |
| 2009/0216956 A1 | 8/2009 | Ekanadham et al. | |

(Continued)

FOREIGN PATENT DOCUMENTS

WO    2014/178450 A1    11/2014

OTHER PUBLICATIONS

Afra A.T., et al., "Local Shading Coherence Extraction for SIMD-Efficient Path Tracing on CPUs," Intel Corporation, High Performance Graphics (2016), Eurographics Proceedings, 2016, 10 pages.

(Continued)

*Primary Examiner* — Phuc N Doan
(74) *Attorney, Agent, or Firm* — Nicholson De Vos Webster & Elliott LLP

(57) ABSTRACT

An apparatus and method for efficient ray tracing. For example, one embodiment of an apparatus comprises: a general purpose processor to generate a plurality of ray streams; a first hardware queue to receive the ray streams generated by the general purpose processor; a graphics processing unit (GPU) comprising a plurality of execution units (EUs) to process the ray streams from the first hardware queue; a second hardware queue to store graphics processing jobs submitted by the GPU; the general purpose processor to process the jobs submitted by the GPU and share results with the GPU.

15 Claims, 21 Drawing Sheets

(56) References Cited

U.S. PATENT DOCUMENTS

| | | |
|---|---|---|
| 2010/0110083 A1 | 5/2010 | Paltashev et al. |
| 2011/0157195 A1 | 6/2011 | Sprangle et al. |
| 2012/0162234 A1 | 6/2012 | Blinzer et al. |
| 2013/0247054 A1 | 9/2013 | Schmit et al. |
| 2014/0078143 A1 | 3/2014 | Lee et al. |
| 2014/0104271 A1 | 4/2014 | Shin et al. |
| 2015/0199137 A1 | 7/2015 | Shin et al. |
| 2015/0234601 A1 | 8/2015 | Tsai et al. |
| 2016/0019065 A1 | 1/2016 | Hayenga et al. |
| 2016/0203081 A1 | 7/2016 | Kimura |
| 2017/0256019 A1 | 9/2017 | Vembu et al. |
| 2019/0012559 A1* | 1/2019 | Desappan et al. ..... H04N 5/232 382/103 |
| 2019/0087992 A1 | 3/2019 | Clarberg et al. |

OTHER PUBLICATIONS

Barringer R., et al., "Dynamic Ray Stream Traversal," ACM Transactions on Graphics, 2014, 9 pages.

Barringer R., et al., "Ray Accelerator: Efficient and Flexible Ray Tracing on a Heterogeneous Architecture," Computer Graphics Forum, vol. xx (200y), No. z, Sep. 2016, pp. 1-12.

Clarberg P., et al., "AMFS: Adaptive Multi-Frequency Shading for Future Graphics Processors," ACM Transactions on Graphics, Aug. 2014, vol. 33, No. 4, 12 pages.

Final Office Action, U.S. Appl. No. 15/268,498, dated Apr. 5, 2019, 15 pages.

Guenter B., et al., "Foveated 30 Graphics," ACM SIGGRAPH Asia, Nov. 2012, 10 pages.

Hillesland K.E., et al., "Texel Shading," Advanced Micro Devices Inc, Eurographics Proceedings, 2016, 4 pages.

International Preliminary Report on Patentability for Application No. PCT/US2017/046842, dated Mar. 28, 2019, 9 pages.

International Search Report and Written Opinion for Application No. PCT/US2017/046842, dated Jul. 2, 2018, 13 pages.

Munkberg J., et al., "Texture Space Caching and Reconstruction for Ray Tracing," ACM Transactions on Graphics, vol. 35, No. 6, Dec. 5-8, 2016, pp. 1-13.

Non-Final Office Action, U.S. Appl. No. 15/268,498, dated Jul. 12, 2019, 8 pages.

Non-Final Office Action, U.S. Appl. No. 15/268,498, dated Sep. 20, 2018, 11 pages.

Notice of Allowance, U.S. Appl. No. 15/268,498, dated Oct. 22, 2019, 7 pages.

Requirement for Restriction/Election, U.S. Appl. No. 15/268,498, dated Apr. 5, 2018, 8 pages.

\* cited by examiner

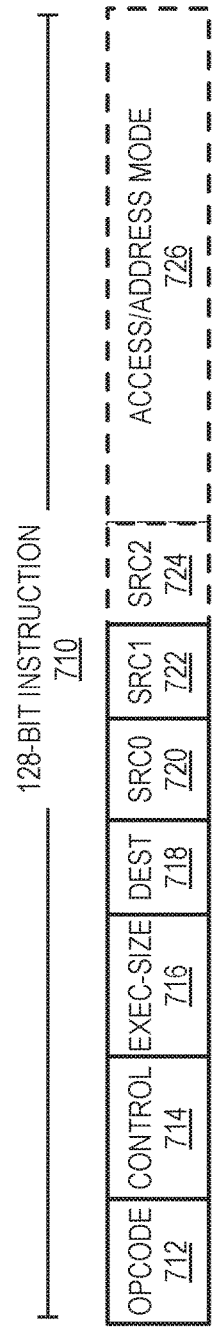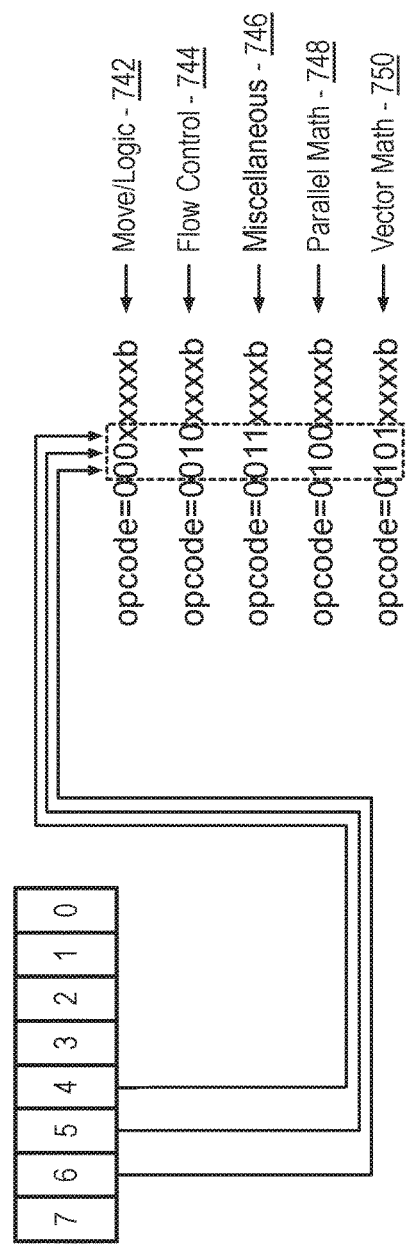
FIG. 7

APPARATUS AND METHOD FOR OPTIMIZED RAY TRACING

CROSS-REFERENCE TO RELATED APPLICATIONS

This application is a divisional of application Ser. No. 15/268,498, filed Sep. 16, 2016, which is hereby incorporated by reference.

TECHNICAL FIELD

This invention relates generally to the field of computer processors. More particularly, the invention relates to an apparatus and method for optimized ray tracing.

BACKGROUND ART

Ray tracing is a rendering technique that can generate photo-realistic images. It works by shooting rays through a scene and computing shading at intersected points, and accumulating values for pixels. In a sense, one can say that ray tracing simulates the interaction of photons with materials and geometry.

In a heterogeneous system, consisting of, for example, a CPU with several cores and a graphics processor, one wants exploit all the resources in the best possible way in order to get the best possible performance. Some systems have split the tasks so that ray tracing (traversal of spatial data structure and intersection testing) is done on the graphics processor, while shading is done on the CPU cores, or vice versa. It is important to reduce the communication between two compute units. A CPU core is a compute unit, for example, and an EU in the graphics processor is another type of compute unit. Some systems use shared memory for ray sharing, but the communication still takes time because new jobs are started for each stream of rays that are shared from one side to the other.

BRIEF DESCRIPTION OF THE DRAWINGS

A better understanding of the present invention can be obtained from the following detailed description in conjunction with the following drawings, in which:

FIG. 7 illustrates a graphics processor execution unit instruction format according to an embodiment;

DETAILED DESCRIPTION

In the following description, for the purposes of explanation, numerous specific details are set forth in order to provide a thorough understanding of the embodiments of the invention described below. It will be apparent, however, to one skilled in the art that the embodiments of the invention may be practiced without some of these specific details. In other instances, well-known structures and devices are shown in block diagram form to avoid obscuring the underlying principles of the embodiments of the invention.

Exemplary Graphics Processor Architectures and Data Types

System Overview

Figure 1:
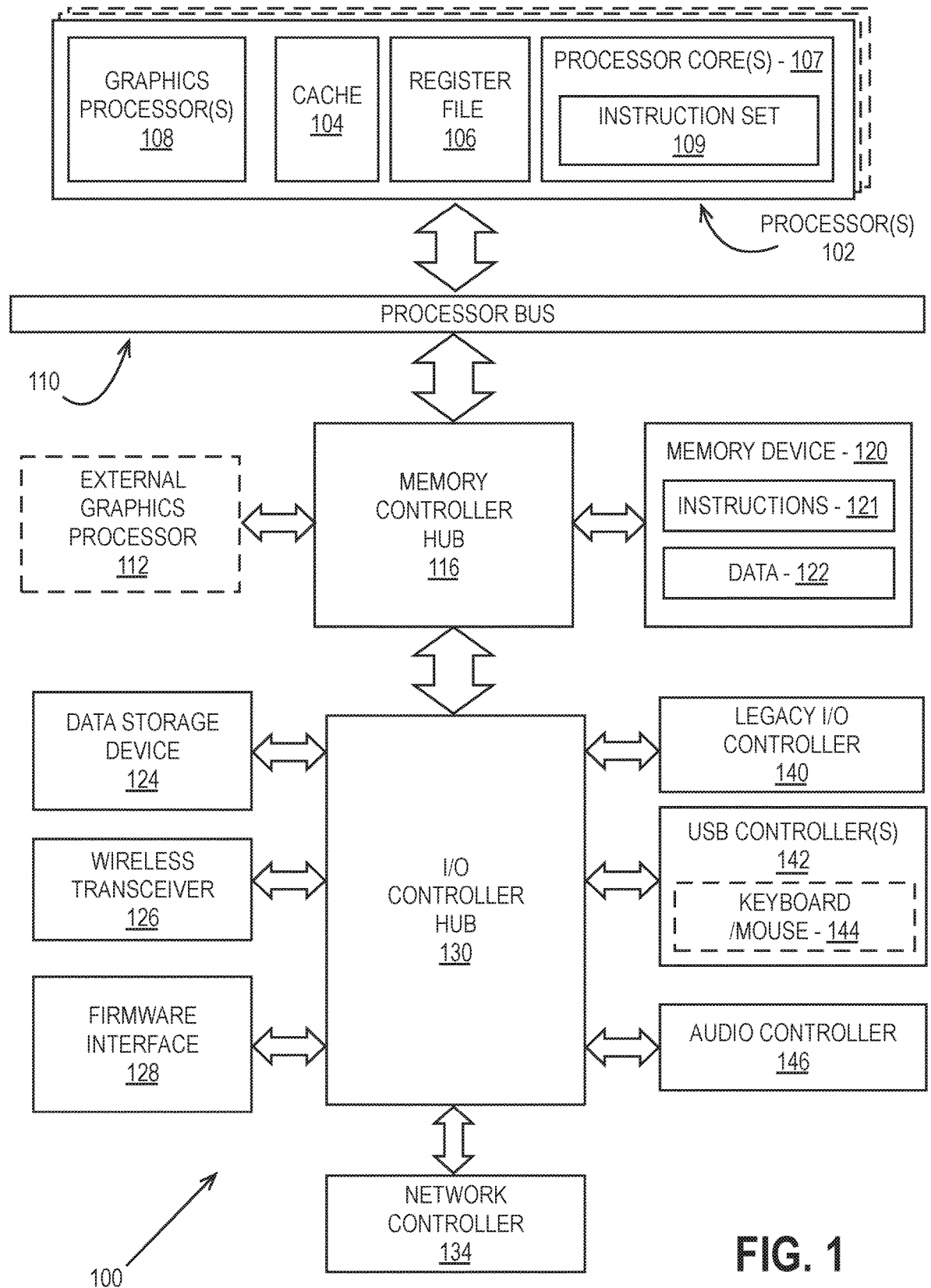
FIG. 1 is a block diagram of an embodiment of a computer system with a processor having one or more processor cores and graphics processors.

FIG. 1 is a block diagram of a processing system 100, according to an embodiment. In various embodiments the system 100 includes one or more processors 102 and one or more graphics processors 108, and may be a single processor desktop system, a multiprocessor workstation system, or a server system having a large number of processors 102 or processor cores 107. In one embodiment, the system 100 is a processing platform incorporated within a system-on-a-chip (SoC) integrated circuit for use in mobile, handheld, or embedded devices.

An embodiment of system 100 can include, or be incorporated within a server-based gaming platform, a game console, including a game and media console, a mobile gaming console, a handheld game console, or an online game console. In some embodiments system 100 is a mobile phone, smart phone, tablet computing device or mobile Internet device. Data processing system 100 can also include, couple with, or be integrated within a wearable device, such as a smart watch wearable device, smart eyewear device, augmented reality device, or virtual reality device. In some embodiments, data processing system 100 is a television or set top box device having one or more processors 102 and a graphical interface generated by one or more graphics processors 108.

In some embodiments, the one or more processors 102 each include one or more processor cores 107 to process instructions which, when executed, perform operations for system and user software. In some embodiments, each of the one or more processor cores 107 is configured to process a specific instruction set 109. In some embodiments, instruction set 109 may facilitate Complex Instruction Set Computing (CISC), Reduced Instruction Set Computing (RISC), or computing via a Very Long Instruction Word (VLIW). Multiple processor cores 107 may each process a different instruction set 109, which may include instructions to facilitate the emulation of other instruction sets. Processor core 107 may also include other processing devices, such a Digital Signal Processor (DSP).

In some embodiments, the processor 102 includes cache memory 104. Depending on the architecture, the processor 102 can have a single internal cache or multiple levels of internal cache. In some embodiments, the cache memory is shared among various components of the processor 102. In some embodiments, the processor 102 also uses an external cache (e.g., a Level-3 (L3) cache or Last Level Cache (LLC)) (not shown), which may be shared among processor cores 107 using known cache coherency techniques. A register file 106 is additionally included in processor 102 which may include different types of registers for storing different types of data (e.g., integer registers, floating point registers, status registers, and an instruction pointer register). Some registers may be general-purpose registers, while other registers may be specific to the design of the processor 102.

In some embodiments, processor 102 is coupled with a processor bus 110 to transmit communication signals such as address, data, or control signals between processor 102 and other components in system 100. In one embodiment the system 100 uses an exemplary 'hub' system architecture, including a memory controller hub 116 and an Input Output (I/O) controller hub 130. A memory controller hub 116 facilitates communication between a memory device and other components of system 100, while an I/O Controller Hub (ICH) 130 provides connections to I/O devices via a local I/O bus. In one embodiment, the logic of the memory controller hub 116 is integrated within the processor.

Memory device 120 can be a dynamic random access memory (DRAM) device, a static random access memory (SRAM) device, flash memory device, phase-change memory device, or some other memory device having suitable performance to serve as process memory. In one embodiment the memory device 120 can operate as system memory for the system 100, to store data 122 and instructions 121 for use when the one or more processors 102 executes an application or process. Memory controller hub 116 also couples with an optional external graphics processor 112, which may communicate with the one or more graphics processors 108 in processors 102 to perform graphics and media operations.

In some embodiments, ICH 130 enables peripherals to connect to memory device 120 and processor 102 via a high-speed I/O bus. The I/O peripherals include, but are not limited to, an audio controller 146, a firmware interface 128, a wireless transceiver 126 (e.g., Wi-Fi, Bluetooth), a data storage device 124 (e.g., hard disk drive, flash memory, etc.), and a legacy I/O controller 140 for coupling legacy (e.g., Personal System 2 (PS/2)) devices to the system. One or more Universal Serial Bus (USB) controllers 142 connect input devices, such as keyboard and mouse 144 combinations. A network controller 134 may also couple with ICH 130. In some embodiments, a high-performance network controller (not shown) couples with processor bus 110. It will be appreciated that the system 100 shown is exemplary and not limiting, as other types of data processing systems that are differently configured may also be used. For example, the I/O controller hub 130 may be integrated within the one or more processor 102, or the memory controller hub 116 and I/O controller hub 130 may be integrated into a discreet external graphics processor, such as the external graphics processor 112.

Figure 2:
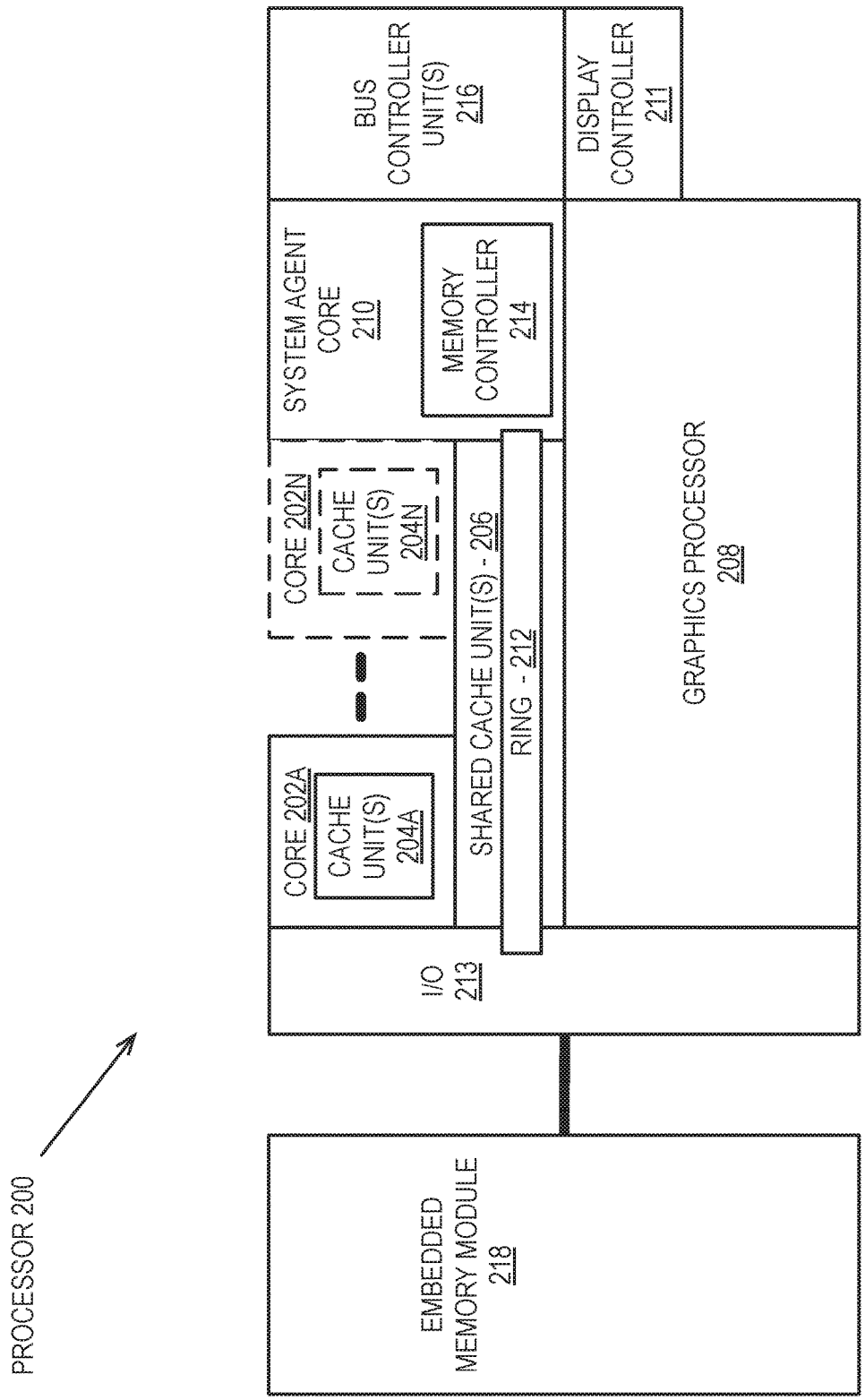
FIG. 2 is a block diagram of one embodiment of a processor having one or more processor cores, an integrated memory controller, and an integrated graphics processor.

FIG. 2 is a block diagram of an embodiment of a processor 200 having one or more processor cores 202A-202N, an integrated memory controller 214, and an integrated graphics processor 208. Those elements of FIG. 2 having the same reference numbers (or names) as the elements of any other figure herein can operate or function in any manner similar to that described elsewhere herein, but are not limited to such. Processor 200 can include additional cores up to and including additional core 202N represented by the dashed lined boxes. Each of processor cores 202A-202N includes one or more internal cache units 204A-204N. In some embodiments each processor core also has access to one or more shared cached units 206.

The internal cache units 204A-204N and shared cache units 206 represent a cache memory hierarchy within the processor 200. The cache memory hierarchy may include at least one level of instruction and data cache within each processor core and one or more levels of shared mid-level cache, such as a Level 2 (L2), Level 3 (L3), Level 4 (L4), or other levels of cache, where the highest level of cache before external memory is classified as the LLC. In some embodiments, cache coherency logic maintains coherency between the various cache units 206 and 204A-204N.

In some embodiments, processor 200 may also include a set of one or more bus controller units 216 and a system agent core 210. The one or more bus controller units 216 manage a set of peripheral buses, such as one or more Peripheral Component Interconnect buses (e.g., PCI, PCI Express). System agent core 210 provides management functionality for the various processor components. In some embodiments, system agent core 210 includes one or more integrated memory controllers 214 to manage access to various external memory devices (not shown).

In some embodiments, one or more of the processor cores 202A-202N include support for simultaneous multi-threading. In such embodiment, the system agent core 210 includes components for coordinating and operating cores 202A-202N during multi-threaded processing. System agent core 210 may additionally include a power control unit (PCU), which includes logic and components to regulate the power state of processor cores 202A-202N and graphics processor 208.

In some embodiments, processor 200 additionally includes graphics processor 208 to execute graphics processing operations. In some embodiments, the graphics processor 208 couples with the set of shared cache units 206, and the system agent core 210, including the one or more integrated memory controllers 214. In some embodiments, a display controller 211 is coupled with the graphics processor 208 to drive graphics processor output to one or more coupled displays. In some embodiments, display controller

211 may be a separate module coupled with the graphics processor via at least one interconnect, or may be integrated within the graphics processor 208 or system agent core 210.

In some embodiments, a ring based interconnect unit 212 is used to couple the internal components of the processor 200. However, an alternative interconnect unit may be used, such as a point-to-point interconnect, a switched interconnect, or other techniques, including techniques well known in the art. In some embodiments, graphics processor 208 couples with the ring interconnect 212 via an I/O link 213.

The exemplary I/O link 213 represents at least one of multiple varieties of I/O interconnects, including an on package I/O interconnect which facilitates communication between various processor components and a high-performance embedded memory module 218, such as an eDRAM module. In some embodiments, each of the processor cores 202A-202N and graphics processor 208 use embedded memory modules 218 as a shared Last Level Cache.

In some embodiments, processor cores 202A-202N are homogenous cores executing the same instruction set architecture. In another embodiment, processor cores 202A-202N are heterogeneous in terms of instruction set architecture (ISA), where one or more of processor cores 202A-202N execute a first instruction set, while at least one of the other cores executes a subset of the first instruction set or a different instruction set. In one embodiment processor cores 202A-202N are heterogeneous in terms of microarchitecture, where one or more cores having a relatively higher power consumption couple with one or more power cores having a lower power consumption. Additionally, processor 200 can be implemented on one or more chips or as an SoC integrated circuit having the illustrated components, in addition to other components.

Figure 3:
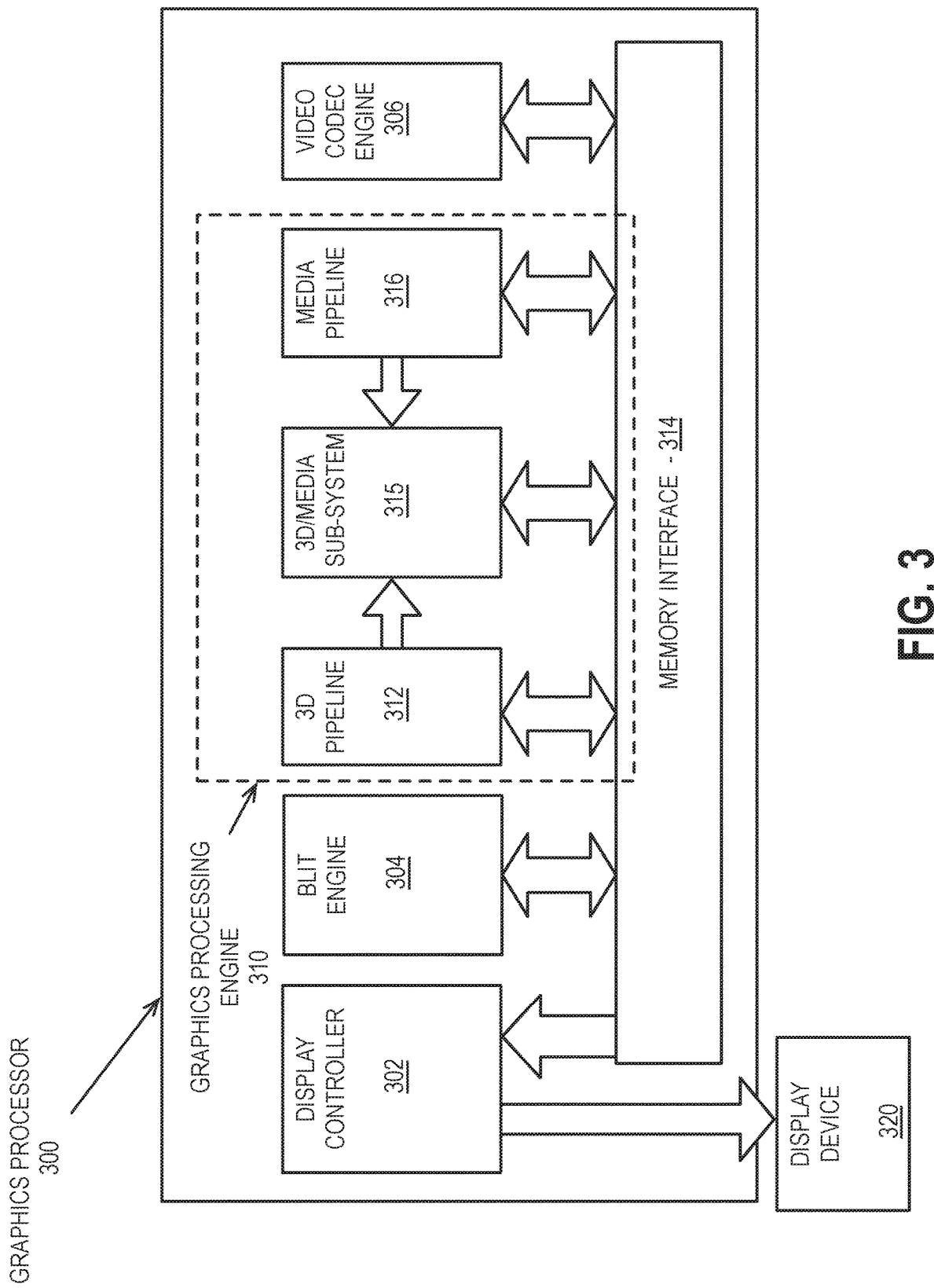
FIG. 3 is a block diagram of one embodiment of a graphics processor which may be a discreet graphics processing unit, or may be graphics processor integrated with a plurality of processing cores.

FIG. 3 is a block diagram of a graphics processor 300, which may be a discrete graphics processing unit, or may be a graphics processor integrated with a plurality of processing cores. In some embodiments, the graphics processor communicates via a memory mapped I/O interface to registers on the graphics processor and with commands placed into the processor memory. In some embodiments, graphics processor 300 includes a memory interface 314 to access memory. Memory interface 314 can be an interface to local memory, one or more internal caches, one or more shared external caches, and/or to system memory.

In some embodiments, graphics processor 300 also includes a display controller 302 to drive display output data to a display device 320. Display controller 302 includes hardware for one or more overlay planes for the display and composition of multiple layers of video or user interface elements. In some embodiments, graphics processor 300 includes a video codec engine 306 to encode, decode, or transcode media to, from, or between one or more media encoding formats, including, but not limited to Moving Picture Experts Group (MPEG) formats such as MPEG-2, Advanced Video Coding (AVC) formats such as H.264/MPEG-4 AVC, as well as the Society of Motion Picture & Television Engineers (SMPTE) 421M/VC-1, and Joint Photographic Experts Group (JPEG) formats such as JPEG, and Motion JPEG (MJPEG) formats.

In some embodiments, graphics processor 300 includes a block image transfer (BLIT) engine 304 to perform two-dimensional (2D) rasterizer operations including, for example, bit-boundary block transfers. However, in one embodiment, 2D graphics operations are performed using one or more components of graphics processing engine (GPE) 310. In some embodiments, GPE 310 is a compute engine for performing graphics operations, including three-dimensional (3D) graphics operations and media operations.

In some embodiments, GPE 310 includes a 3D pipeline 312 for performing 3D operations, such as rendering three-dimensional images and scenes using processing functions that act upon 3D primitive shapes (e.g., rectangle, triangle, etc.). The 3D pipeline 312 includes programmable and fixed function elements that perform various tasks within the element and/or spawn execution threads to a 3D/Media sub-system 315. While 3D pipeline 312 can be used to perform media operations, an embodiment of GPE 310 also includes a media pipeline 316 that is specifically used to perform media operations, such as video post-processing and image enhancement.

In some embodiments, media pipeline 316 includes fixed function or programmable logic units to perform one or more specialized media operations, such as video decode acceleration, video de-interlacing, and video encode acceleration in place of, or on behalf of video codec engine 306. In some embodiments, media pipeline 316 additionally includes a thread spawning unit to spawn threads for execution on 3D/Media sub-system 315. The spawned threads perform computations for the media operations on one or more graphics execution units included in 3D/Media sub-system 315.

In some embodiments, 3D/Media subsystem 315 includes logic for executing threads spawned by 3D pipeline 312 and media pipeline 316. In one embodiment, the pipelines send thread execution requests to 3D/Media subsystem 315, which includes thread dispatch logic for arbitrating and dispatching the various requests to available thread execution resources. The execution resources include an array of graphics execution units to process the 3D and media threads. In some embodiments, 3D/Media subsystem 315 includes one or more internal caches for thread instructions and data. In some embodiments, the subsystem also includes shared memory, including registers and addressable memory, to share data between threads and to store output data.

Graphics Processing Engine

Figure 4:
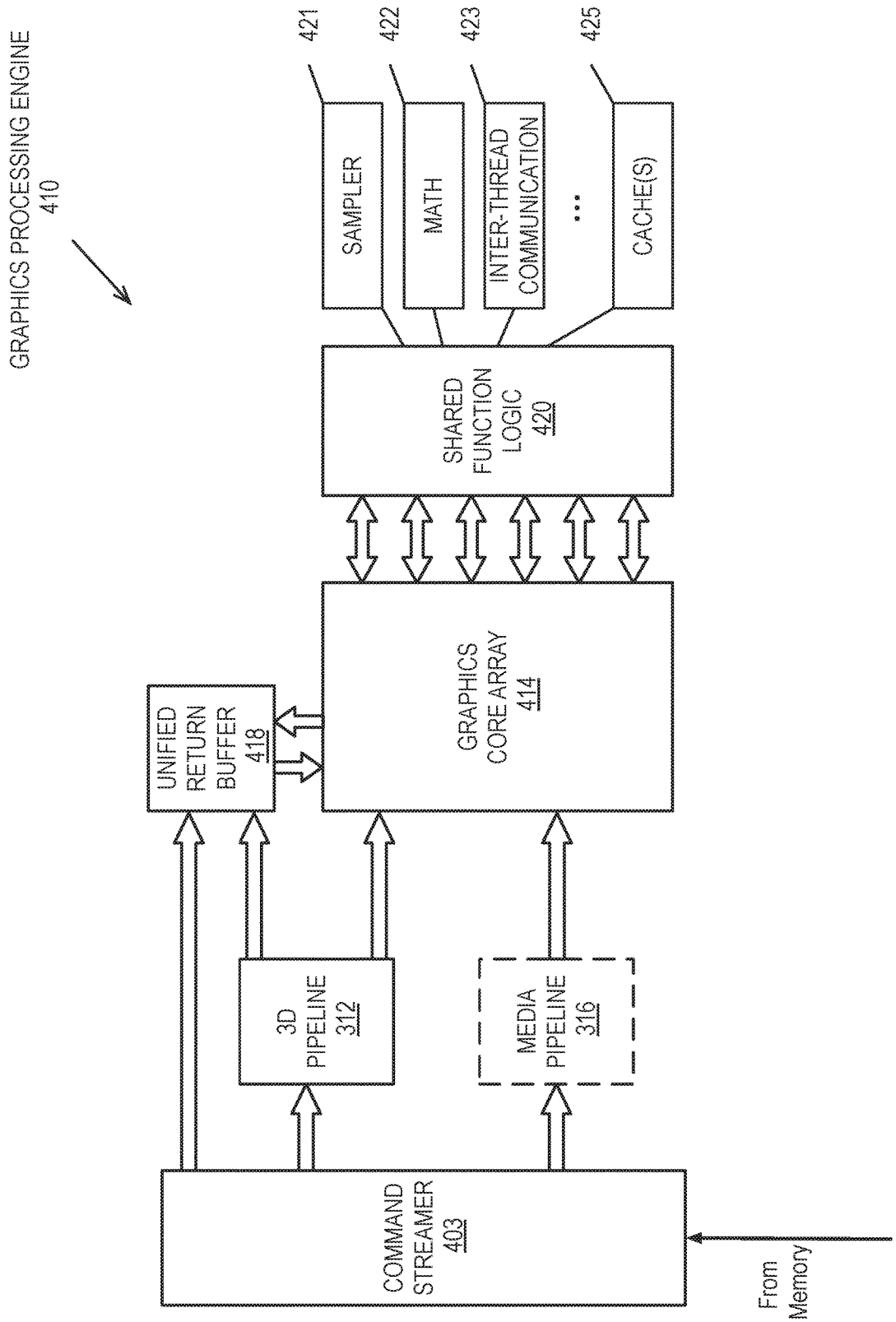
FIG. 4 is a block diagram of an embodiment of a graphics-processing engine for a graphics processor.

FIG. 4 is a block diagram of a graphics processing engine 410 of a graphics processor in accordance with some embodiments. In one embodiment, the graphics processing engine (GPE) 410 is a version of the GPE 310 shown in FIG. 3. Elements of FIG. 4 having the same reference numbers (or names) as the elements of any other figure herein can operate or function in any manner similar to that described elsewhere herein, but are not limited to such. For example, the 3D pipeline 312 and media pipeline 316 of FIG. 3 are illustrated. The media pipeline 316 is optional in some embodiments of the GPE 410 and may not be explicitly included within the GPE 410. For example and in at least one embodiment, a separate media and/or image processor is coupled to the GPE 410.

In some embodiments, GPE 410 couples with or includes a command streamer 403, which provides a command stream to the 3D pipeline 312 and/or media pipelines 316. In some embodiments, command streamer 403 is coupled with memory, which can be system memory, or one or more of internal cache memory and shared cache memory. In some embodiments, command streamer 403 receives commands from the memory and sends the commands to 3D pipeline 312 and/or media pipeline 316. The commands are directives fetched from a ring buffer, which stores commands for the 3D pipeline 312 and media pipeline 316. In one embodiment, the ring buffer can additionally include batch command buffers storing batches of multiple commands. The commands for the 3D pipeline 312 can also include references to data stored in memory, such as but not limited to vertex and geometry data for the 3D pipeline 312 and/or image data and memory objects for the media pipeline 316. The 3D pipeline 312 and media pipeline 316 process the commands and data by performing operations via logic within the respective pipelines or by dispatching one or more execution threads to a graphics core array 414.

In various embodiments the 3D pipeline 312 can execute one or more shader programs, such as vertex shaders, geometry shaders, pixel shaders, fragment shaders, compute shaders, or other shader programs, by processing the instructions and dispatching execution threads to the graphics core array 414. The graphics core array 414 provides a unified block of execution resources. Multi-purpose execution logic (e.g., execution units) within the graphic core array 414 includes support for various 3D API shader languages and can execute multiple simultaneous execution threads associated with multiple shaders.

In some embodiments the graphics core array 414 also includes execution logic to perform media functions, such as video and/or image processing. In one embodiment, the execution units additionally include general-purpose logic that is programmable to perform parallel general purpose computational operations, in addition to graphics processing operations. The general purpose logic can perform processing operations in parallel or in conjunction with general purpose logic within the processor core(s) 107 of FIG. 1 or core 202A-202N as in FIG. 2.

Output data generated by threads executing on the graphics core array 414 can output data to memory in a unified return buffer (URB) 418. The URB 418 can store data for multiple threads. In some embodiments the URB 418 may be used to send data between different threads executing on the graphics core array 414. In some embodiments the URB 418 may additionally be used for synchronization between threads on the graphics core array and fixed function logic within the shared function logic 420.

In some embodiments, graphics core array 414 is scalable, such that the array includes a variable number of graphics cores, each having a variable number of execution units based on the target power and performance level of GPE 410. In one embodiment the execution resources are dynamically scalable, such that execution resources may be enabled or disabled as needed.

The graphics core array 414 couples with shared function logic 420 that includes multiple resources that are shared between the graphics cores in the graphics core array. The shared functions within the shared function logic 420 are hardware logic units that provide specialized supplemental functionality to the graphics core array 414. In various embodiments, shared function logic 420 includes but is not limited to sampler 421, math 422, and inter-thread communication (ITC) 423 logic. Additionally, some embodiments implement one or more cache(s) 425 within the shared function logic 420. A shared function is implemented where the demand for a given specialized function is insufficient for inclusion within the graphics core array 414. Instead a single instantiation of that specialized function is implemented as a stand-alone entity in the shared function logic 420 and shared among the execution resources within the graphics core array 414. The precise set of functions that are shared between the graphics core array 414 and included within the graphics core array 414 varies between embodiments.

Figure 5:
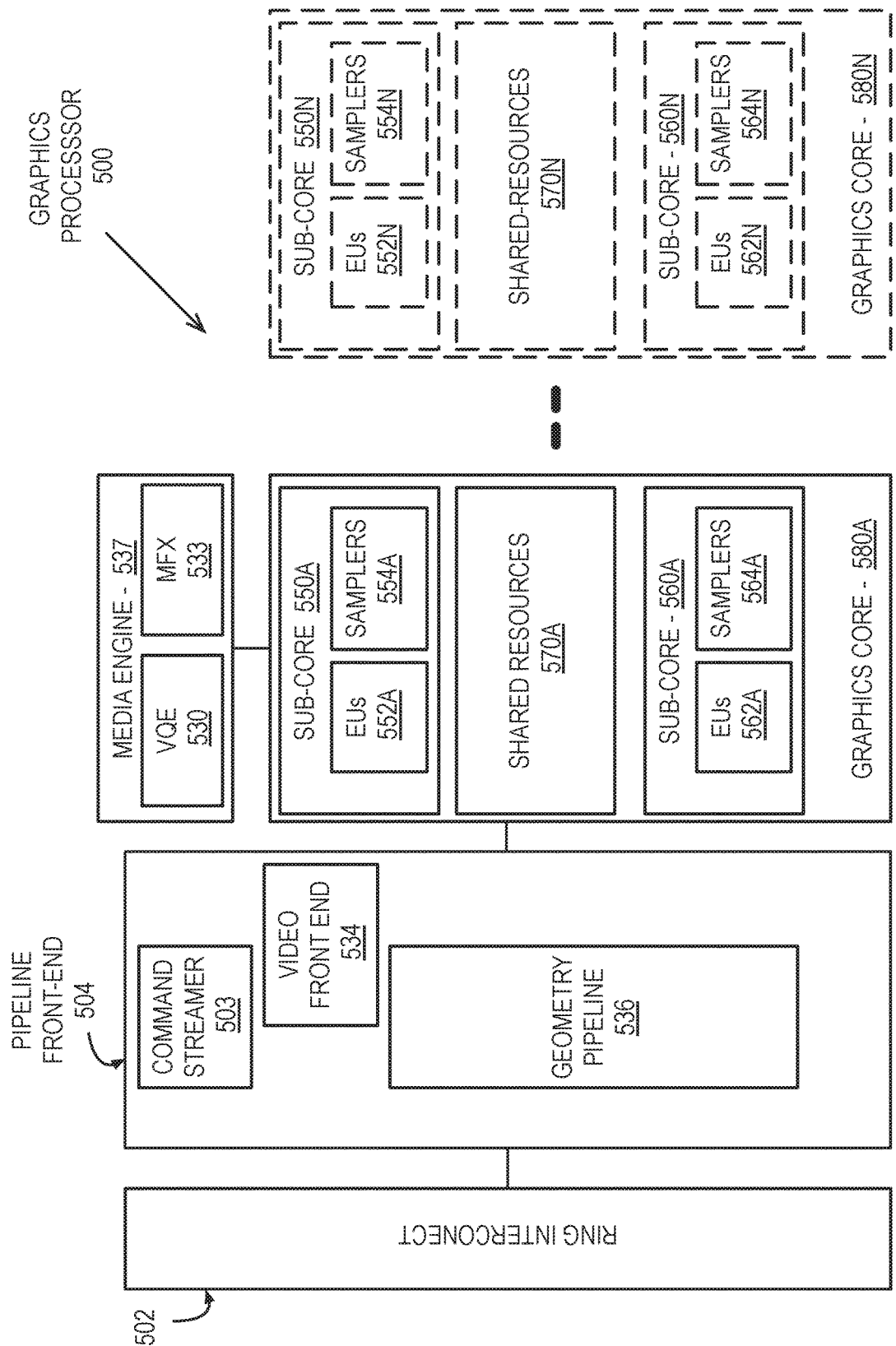
FIG. 5 is a block diagram of another embodiment of a graphics processor.

FIG. 5 is a block diagram of another embodiment of a graphics processor 500. Elements of FIG. 5 having the same reference numbers (or names) as the elements of any other figure herein can operate or function in any manner similar to that described elsewhere herein, but are not limited to such.

In some embodiments, graphics processor 500 includes a ring interconnect 502, a pipeline front-end 504, a media engine 537, and graphics cores 580A-580N. In some embodiments, ring interconnect 502 couples the graphics processor to other processing units, including other graphics processors or one or more general-purpose processor cores. In some embodiments, the graphics processor is one of many processors integrated within a multi-core processing system.

In some embodiments, graphics processor 500 receives batches of commands via ring interconnect 502. The incoming commands are interpreted by a command streamer 503 in the pipeline front-end 504. In some embodiments, graphics processor 500 includes scalable execution logic to perform 3D geometry processing and media processing via the graphics core(s) 580A-580N. For 3D geometry processing commands, command streamer 503 supplies commands to geometry pipeline 536. For at least some media processing commands, command streamer 503 supplies the commands to a video front end 534, which couples with a media engine 537. In some embodiments, media engine 537 includes a Video Quality Engine (VQE) 530 for video and image post-processing and a multi-format encode/decode (MFX) 533 engine to provide hardware-accelerated media data encode and decode. In some embodiments, geometry pipeline 536 and media engine 537 each generate execution threads for the thread execution resources provided by at least one graphics core 580A.

In some embodiments, graphics processor 500 includes scalable thread execution resources featuring modular cores 580A-580N (sometimes referred to as core slices), each having multiple sub-cores 550A-550N, 560A-560N (sometimes referred to as core sub-slices). In some embodiments, graphics processor 500 can have any number of graphics cores 580A through 580N. In some embodiments, graphics processor 500 includes a graphics core 580A having at least a first sub-core 550A and a second sub-core 560A. In other embodiments, the graphics processor is a low power processor with a single sub-core (e.g., 550A). In some embodiments, graphics processor 500 includes multiple graphics cores 580A-580N, each including a set of first sub-cores 550A-550N and a set of second sub-cores 560A-560N. Each sub-core in the set of first sub-cores 550A-550N includes at least a first set of execution units 552A-552N and media/texture samplers 554A-554N. Each sub-core in the set of second sub-cores 560A-560N includes at least a second set of execution units 562A-562N and samplers 564A-564N. In some embodiments, each sub-core 550A-550N, 560A-560N shares a set of shared resources 570A-570N. In some embodiments, the shared resources include shared cache memory and pixel operation logic. Other shared resources may also be included in the various embodiments of the graphics processor.

Execution Units

Figure 6:
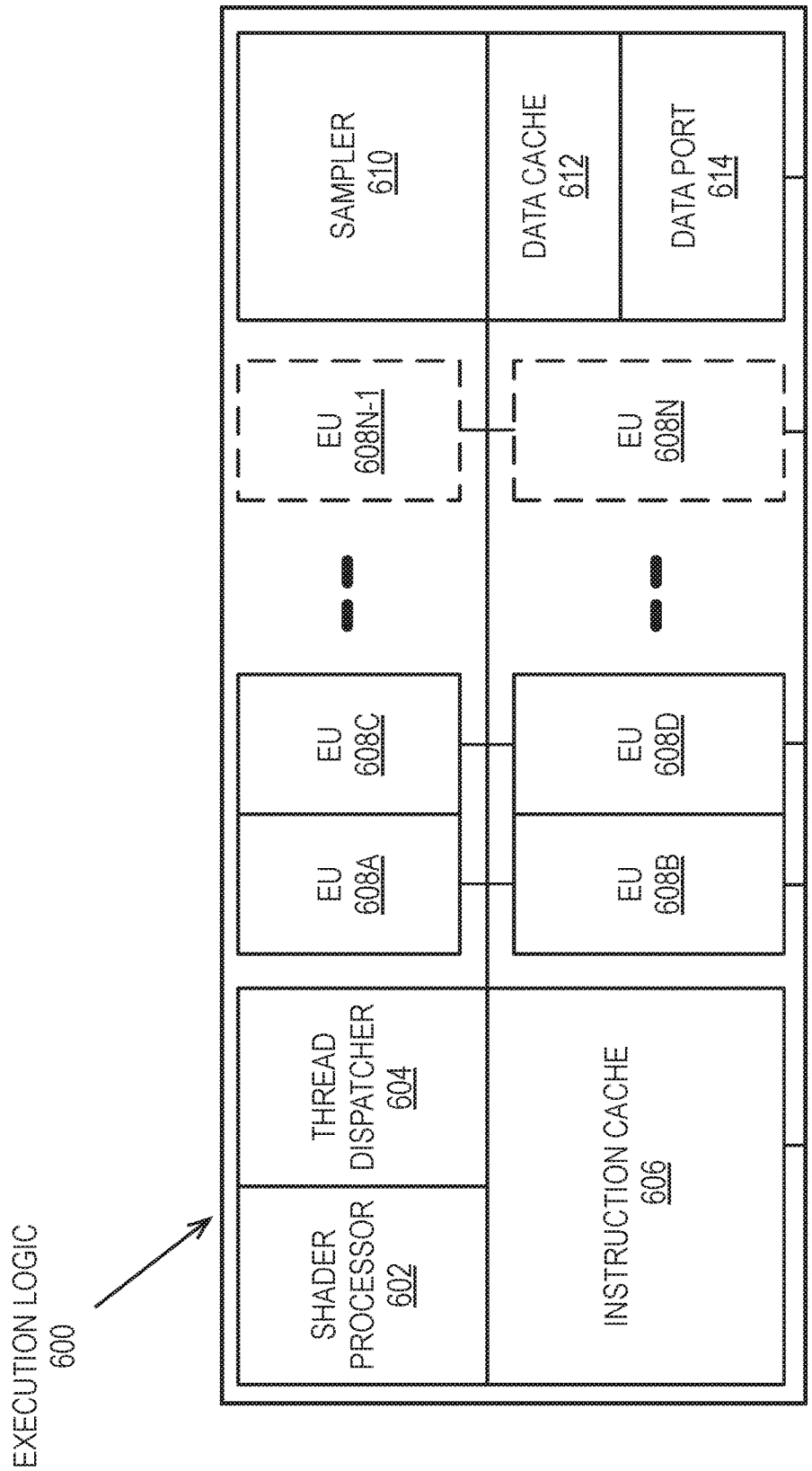
FIG. 6 is a block diagram of thread execution logic including an array of processing elements.

FIG. 6 illustrates thread execution logic 600 including an array of processing elements employed in some embodiments of a GPE. Elements of FIG. 6 having the same reference numbers (or names) as the elements of any other figure herein can operate or function in any manner similar to that described elsewhere herein, but are not limited to such.

In some embodiments, thread execution logic 600 includes a shader processor 602, a thread dispatcher 604, instruction cache 606, a scalable execution unit array including a plurality of execution units 608A-608N, a sampler 610, a data cache 612, and a data port 614. In one embodiment the scalable execution unit array can dynamically scale by enabling or disabling one or more execution units (e.g., any of execution unit 608A, 608B, 608C, 608D, through 608N-1 and 608N) based on the computational requirements of a workload. In one embodiment the included components are interconnected via an interconnect fabric that links to each of the components. In some embodiments, thread execution logic 600 includes one or more connections to memory, such as system memory or cache memory, through one or more of instruction cache 606, data port 614, sampler 610, and execution units 608A-608N. In some embodiments, each execution unit (e.g. 608A) is a stand-alone programmable general purpose computational unit that is capable of executing multiple simultaneous hardware threads while processing multiple data elements in parallel for each thread. In various embodiments, the array of execution units 608A-608N is scalable to include any number individual execution units.

In some embodiments, the execution units 608A-608N are primarily used to execute shader programs. A shader processor 602 can process the various shader programs and dispatch execution threads associated with the shader programs via a thread dispatcher 604. In one embodiment the thread dispatcher includes logic to arbitrate thread initiation requests from the graphics and media pipelines and instantiate the requested threads on one or more execution unit in the execution units 608A-608N. For example, the geometry pipeline (e.g., 536 of FIG. 5) can dispatch vertex, tessellation, or geometry shaders to the thread execution logic 600 (FIG. 6) for processing. In some embodiments, thread dispatcher 604 can also process runtime thread spawning requests from the executing shader programs.

In some embodiments, the execution units 608A-608N support an instruction set that includes native support for many standard 3D graphics shader instructions, such that shader programs from graphics libraries (e.g., Direct 3D and OpenGL) are executed with a minimal translation. The execution units support vertex and geometry processing (e.g., vertex programs, geometry programs, vertex shaders), pixel processing (e.g., pixel shaders, fragment shaders) and general-purpose processing (e.g., compute and media shaders). Each of the execution units 608A-608N is capable of multi-issue single instruction multiple data (SIMD) execution and multi-threaded operation enables an efficient execution environment in the face of higher latency memory accesses. Each hardware thread within each execution unit has a dedicated high-bandwidth register file and associated independent thread-state. Execution is multi-issue per clock to pipelines capable of integer, single and double precision floating point operations, SIMD branch capability, logical operations, transcendental operations, and other miscellaneous operations. While waiting for data from memory or one of the shared functions, dependency logic within the execution units 608A-608N causes a waiting thread to sleep until the requested data has been returned. While the waiting thread is sleeping, hardware resources may be devoted to processing other threads. For example, during a delay associated with a vertex shader operation, an execution unit can perform operations for a pixel shader, fragment shader, or another type of shader program, including a different vertex shader.

Each execution unit in execution units 608A-608N operates on arrays of data elements. The number of data elements is the "execution size," or the number of channels for the instruction. An execution channel is a logical unit of execution for data element access, masking, and flow control within instructions. The number of channels may be independent of the number of physical Arithmetic Logic Units (ALUs) or Floating Point Units (FPUs) for a particular graphics processor. In some embodiments, execution units 608A-608N support integer and floating-point data types.

The execution unit instruction set includes SIMD instructions. The various data elements can be stored as a packed data type in a register and the execution unit will process the various elements based on the data size of the elements. For example, when operating on a 256-bit wide vector, the 256 bits of the vector are stored in a register and the execution unit operates on the vector as four separate 64-bit packed data elements (Quad-Word (QW) size data elements), eight separate 32-bit packed data elements (Double Word (DW) size data elements), sixteen separate 16-bit packed data elements (Word (W) size data elements), or thirty-two separate 8-bit data elements (byte (B) size data elements). However, different vector widths and register sizes are possible.

One or more internal instruction caches (e.g., 606) are included in the thread execution logic 600 to cache thread instructions for the execution units. In some embodiments, one or more data caches (e.g., 612) are included to cache thread data during thread execution. In some embodiments, a sampler 610 is included to provide texture sampling for 3D operations and media sampling for media operations. In some embodiments, sampler 610 includes specialized texture or media sampling functionality to process texture or media data during the sampling process before providing the sampled data to an execution unit.

During execution, the graphics and media pipelines send thread initiation requests to thread execution logic 600 via thread spawning and dispatch logic. Once a group of geometric objects has been processed and rasterized into pixel data, pixel processor logic (e.g., pixel shader logic, fragment shader logic, etc.) within the shader processor 602 is invoked to further compute output information and cause results to be written to output surfaces (e.g., color buffers, depth buffers, stencil buffers, etc.). In some embodiments, a pixel shader or fragment shader calculates the values of the various vertex attributes that are to be interpolated across the rasterized object. In some embodiments, pixel processor logic within the shader processor 602 then executes an application programming interface (API)-supplied pixel or fragment shader program. To execute the shader program, the shader processor 602 dispatches threads to an execution unit (e.g., 608A) via thread dispatcher 604. In some embodiments, pixel shader 602 uses texture sampling logic in the sampler 610 to access texture data in texture maps stored in memory. Arithmetic operations on the texture data and the input geometry data compute pixel color data for each geometric fragment, or discards one or more pixels from further processing.

In some embodiments, the data port 614 provides a memory access mechanism for the thread execution logic 600 output processed data to memory for processing on a graphics processor output pipeline. In some embodiments, the data port 614 includes or couples to one or more cache memories (e.g., data cache 612) to cache data for memory access via the data port.

FIG. 7 is a block diagram illustrating a graphics processor instruction formats 700 according to some embodiments. In one or more embodiment, the graphics processor execution units support an instruction set having instructions in multiple formats. The solid lined boxes illustrate the components that are generally included in an execution unit instruction, while the dashed lines include components that are optional or that are only included in a sub-set of the instructions. In some embodiments, instruction format 700 described and illustrated are macro-instructions, in that they are instructions supplied to the execution unit, as opposed to micro-operations resulting from instruction decode once the instruction is processed.

In some embodiments, the graphics processor execution units natively support instructions in a 128-bit instruction format 710. A 64-bit compacted instruction format 730 is available for some instructions based on the selected instruction, instruction options, and number of operands. The native 128-bit instruction format 710 provides access to all instruction options, while some options and operations are restricted in the 64-bit instruction format 730. The native instructions available in the 64-bit instruction format 730 vary by embodiment. In some embodiments, the instruction is compacted in part using a set of index values in an index field 713. The execution unit hardware references a set of compaction tables based on the index values and uses the compaction table outputs to reconstruct a native instruction in the 128-bit instruction format 710.

For each format, instruction opcode 712 defines the operation that the execution unit is to perform. The execution units execute each instruction in parallel across the multiple data elements of each operand. For example, in response to an add instruction the execution unit performs a simultaneous add operation across each color channel representing a texture element or picture element. By default, the execution unit performs each instruction across all data channels of the operands. In some embodiments, instruction control field 714 enables control over certain execution options, such as channels selection (e.g., predication) and data channel order (e.g., swizzle). For instructions in the 128-bit instruction format 710 an exec-size field 716 limits the number of data channels that will be executed in parallel. In some embodiments, exec-size field 716 is not available for use in the 64-bit compact instruction format 730.

Some execution unit instructions have up to three operands including two source operands, src0 720, src1 722, and one destination 718. In some embodiments, the execution units support dual destination instructions, where one of the destinations is implied. Data manipulation instructions can have a third source operand (e.g., SRC2 724), where the instruction opcode 712 determines the number of source operands. An instruction's last source operand can be an immediate (e.g., hard-coded) value passed with the instruction.

In some embodiments, the 128-bit instruction format 710 includes an access/address mode field 726 specifying, for example, whether direct register addressing mode or indirect register addressing mode is used. When direct register addressing mode is used, the register address of one or more operands is directly provided by bits in the instruction.

In some embodiments, the 128-bit instruction format 710 includes an access/address mode field 726, which specifies an address mode and/or an access mode for the instruction. In one embodiment the access mode is used to define a data access alignment for the instruction. Some embodiments support access modes including a 16-byte aligned access mode and a 1-byte aligned access mode, where the byte alignment of the access mode determines the access alignment of the instruction operands. For example, when in a first mode, the instruction may use byte-aligned addressing for source and destination operands and when in a second mode, the instruction may use 16-byte-aligned addressing for all source and destination operands.

In one embodiment, the address mode portion of the access/address mode field 726 determines whether the instruction is to use direct or indirect addressing. When direct register addressing mode is used bits in the instruction directly provide the register address of one or more operands. When indirect register addressing mode is used, the register address of one or more operands may be computed based on an address register value and an address immediate field in the instruction.

In some embodiments instructions are grouped based on opcode 712 bit-fields to simplify Opcode decode 740. For an 8-bit opcode, bits 4, 5, and 6 allow the execution unit to determine the type of opcode. The precise opcode grouping shown is merely an example. In some embodiments, a move and logic opcode group 742 includes data movement and logic instructions (e.g., move (mov), compare (cmp)). In some embodiments, move and logic group 742 shares the five most significant bits (MSB), where move (mov) instructions are in the form of 0000xxxxb and logic instructions are in the form of 0001xxxxb. A flow control instruction group 744 (e.g., call, jump (jmp)) includes instructions in the form of 0010xxxxb (e.g., 0x20). A miscellaneous instruction group 746 includes a mix of instructions, including synchronization instructions (e.g., wait, send) in the form of 0011xxxxb (e.g., 0x30). A parallel math instruction group 748 includes component-wise arithmetic instructions (e.g., add, multiply (mul)) in the form of 0100xxxxb (e.g., 0x40). The parallel math group 748 performs the arithmetic operations in parallel across data channels. The vector math group 750 includes arithmetic instructions (e.g., dp4) in the form of 0101xxxxb (e.g., 0x50). The vector math group performs arithmetic such as dot product calculations on vector operands.

Graphics Pipeline

Figure 8:
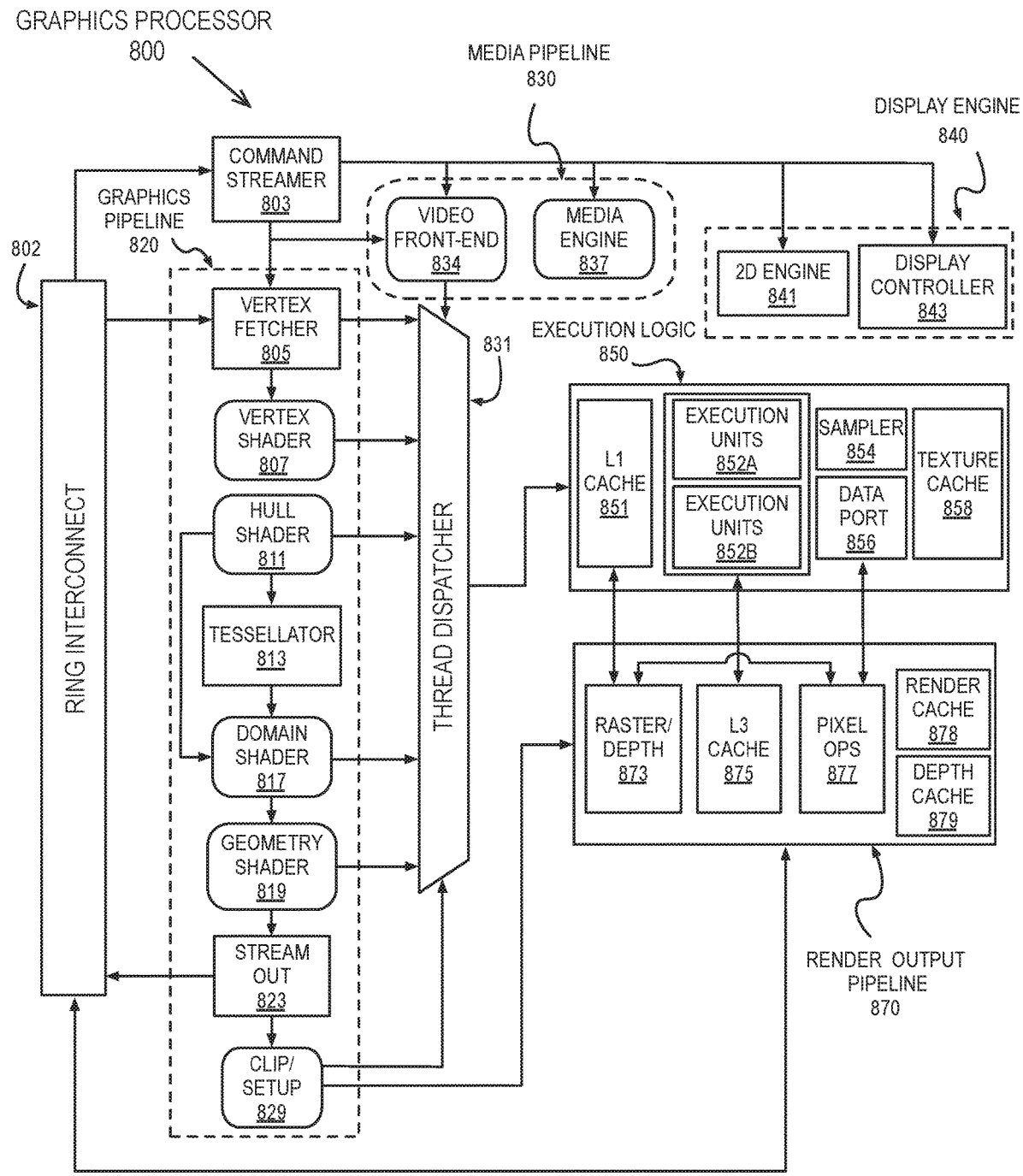
FIG. 8 is a block diagram of another embodiment of a graphics processor which includes a graphics pipeline, a media pipeline, a display engine, thread execution logic, and a render output pipeline.

FIG. 8 is a block diagram of another embodiment of a graphics processor 800. Elements of FIG. 8 having the same reference numbers (or names) as the elements of any other figure herein can operate or function in any manner similar to that described elsewhere herein, but are not limited to such.

In some embodiments, graphics processor 800 includes a graphics pipeline 820, a media pipeline 830, a display engine 840, thread execution logic 850, and a render output pipeline 870. In some embodiments, graphics processor 800 is a graphics processor within a multi-core processing system that includes one or more general purpose processing cores. The graphics processor is controlled by register writes to one or more control registers (not shown) or via commands issued to graphics processor 800 via a ring interconnect 802. In some embodiments, ring interconnect 802 couples graphics processor 800 to other processing components, such as other graphics processors or general-purpose processors. Commands from ring interconnect 802 are interpreted by a command streamer 803, which supplies instructions to individual components of graphics pipeline 820 or media pipeline 830.

In some embodiments, command streamer 803 directs the operation of a vertex fetcher 805 that reads vertex data from memory and executes vertex-processing commands provided by command streamer 803. In some embodiments, vertex fetcher 805 provides vertex data to a vertex shader 807, which performs coordinate space transformation and lighting operations to each vertex. In some embodiments, vertex fetcher 805 and vertex shader 807 execute vertex-processing instructions by dispatching execution threads to execution units 852A-852B via a thread dispatcher 831.

In some embodiments, execution units 852A-852B are an array of vector processors having an instruction set for performing graphics and media operations. In some embodiments, execution units 852A-852B have an attached L1 cache 851 that is specific for each array or shared between the arrays. The cache can be configured as a data cache, an instruction cache, or a single cache that is partitioned to contain data and instructions in different partitions.

In some embodiments, graphics pipeline 820 includes tessellation components to perform hardware-accelerated tessellation of 3D objects. In some embodiments, a programmable hull shader 811 configures the tessellation operations. A programmable domain shader 817 provides back-end evaluation of tessellation output. A tessellator 813 operates at the direction of hull shader 811 and contains special purpose logic to generate a set of detailed geometric objects based on a coarse geometric model that is provided as input to graphics pipeline 820. In some embodiments, if tessellation is not used, tessellation components (e.g., hull shader 811, tessellator 813, and domain shader 817) can be bypassed.

In some embodiments, complete geometric objects can be processed by a geometry shader 819 via one or more threads dispatched to execution units 852A-852B, or can proceed directly to the clipper 829. In some embodiments, the geometry shader operates on entire geometric objects, rather than vertices or patches of vertices as in previous stages of the graphics pipeline. If the tessellation is disabled the geometry shader 819 receives input from the vertex shader 807. In some embodiments, geometry shader 819 is programmable by a geometry shader program to perform geometry tessellation if the tessellation units are disabled.

Before rasterization, a clipper 829 processes vertex data. The clipper 829 may be a fixed function clipper or a programmable clipper having clipping and geometry shader functions. In some embodiments, a rasterizer and depth test component 873 in the render output pipeline 870 dispatches pixel shaders to convert the geometric objects into their per pixel representations. In some embodiments, pixel shader logic is included in thread execution logic 850. In some embodiments, an application can bypass the rasterizer and depth test component 873 and access un-rasterized vertex data via a stream out unit 823.

The graphics processor 800 has an interconnect bus, interconnect fabric, or some other interconnect mechanism that allows data and message passing amongst the major components of the processor. In some embodiments, execution units 852A-852B and associated cache(s) 851, texture and media sampler 854, and texture/sampler cache 858 interconnect via a data port 856 to perform memory access and communicate with render output pipeline components of the processor. In some embodiments, sampler 854, caches 851, 858 and execution units 852A-852B each have separate memory access paths.

In some embodiments, render output pipeline 870 contains a rasterizer and depth test component 873 that converts vertex-based objects into an associated pixel-based representation. In some embodiments, the rasterizer logic includes a windower/masker unit to perform fixed function triangle and line rasterization. An associated render cache 878 and depth cache 879 are also available in some embodiments. A pixel operations component 877 performs pixel-based operations on the data, though in some instances, pixel operations associated with 2D operations (e.g. bit block image transfers with blending) are performed by the 2D engine 841, or substituted at display time by the display controller 843 using overlay display planes. In some embodiments, a shared L3 cache 875 is available to all graphics components, allowing the sharing of data without the use of main system memory.

In some embodiments, graphics processor media pipeline 830 includes a media engine 837 and a video front end 834. In some embodiments, video front end 834 receives pipeline commands from the command streamer 803. In some embodiments, media pipeline 830 includes a separate command streamer. In some embodiments, video front-end 834 processes media commands before sending the command to the media engine 837. In some embodiments, media engine 837 includes thread spawning functionality to spawn threads for dispatch to thread execution logic 850 via thread dispatcher 831.

In some embodiments, graphics processor 800 includes a display engine 840. In some embodiments, display engine 840 is external to processor 800 and couples with the graphics processor via the ring interconnect 802, or some other interconnect bus or fabric. In some embodiments, display engine 840 includes a 2D engine 841 and a display controller 843. In some embodiments, display engine 840 contains special purpose logic capable of operating independently of the 3D pipeline. In some embodiments, display controller 843 couples with a display device (not shown), which may be a system integrated display device, as in a laptop computer, or an external display device attached via a display device connector.

In some embodiments, graphics pipeline 820 and media pipeline 830 are configurable to perform operations based on multiple graphics and media programming interfaces and are not specific to any one application programming interface (API). In some embodiments, driver software for the graphics processor translates API calls that are specific to a particular graphics or media library into commands that can be processed by the graphics processor. In some embodiments, support is provided for the Open Graphics Library (OpenGL), Open Computing Language (OpenCL), and/or Vulkan graphics and compute API, all from the Khronos Group. In some embodiments, support may also be provided for the Direct3D library from the Microsoft Corporation. In some embodiments, a combination of these libraries may be supported. Support may also be provided for the Open Source Computer Vision Library (OpenCV). A future API with a compatible 3D pipeline would also be supported if a mapping can be made from the pipeline of the future API to the pipeline of the graphics processor.

Graphics Pipeline Programming

Figure 9:
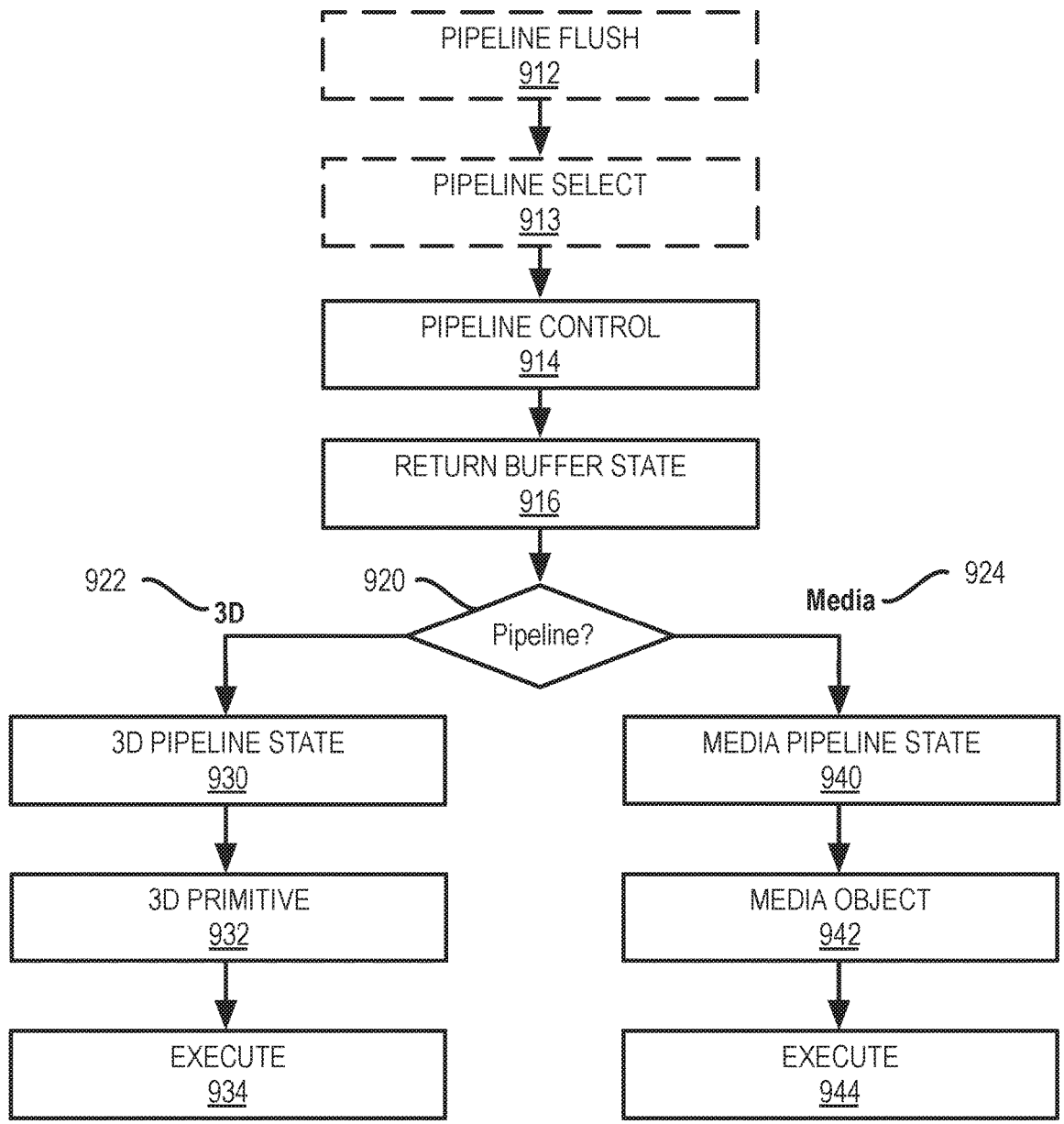
FIG. 9A is a block diagram illustrating a graphics processor command format according to an embodiment.
FIG. 9B is a block diagram illustrating a graphics processor command sequence according to an embodiment.

FIG. 9A is a block diagram illustrating a graphics processor command format 900 according to some embodiments. FIG. 9B is a block diagram illustrating a graphics processor command sequence 910 according to an embodiment. The solid lined boxes in FIG. 9A illustrate the components that are generally included in a graphics command while the dashed lines include components that are optional or that are only included in a sub-set of the graphics commands. The exemplary graphics processor command format 900 of FIG. 9A includes data fields to identify a target client 902 of the command, a command operation code (opcode) 904, and the relevant data 906 for the command. A sub-opcode 905 and a command size 908 are also included in some commands.

In some embodiments, client 902 specifies the client unit of the graphics device that processes the command data. In some embodiments, a graphics processor command parser examines the client field of each command to condition the further processing of the command and route the command data to the appropriate client unit. In some embodiments, the graphics processor client units include a memory interface unit, a render unit, a 2D unit, a 3D unit, and a media unit. Each client unit has a corresponding processing pipeline that processes the commands. Once the command is received by the client unit, the client unit reads the opcode 904 and, if present, sub-opcode 905 to determine the operation to perform. The client unit performs the command using information in data field 906. For some commands an explicit command size 908 is expected to specify the size of the command In some embodiments, the command parser automatically determines the size of at least some of the commands based on the command opcode. In some embodiments commands are aligned via multiples of a double word.

The flow diagram in FIG. 9B shows an exemplary graphics processor command sequence 910. In some embodiments, software or firmware of a data processing system that features an embodiment of a graphics processor uses a version of the command sequence shown to set up, execute, and terminate a set of graphics operations. A sample command sequence is shown and described for purposes of example only as embodiments are not limited to these specific commands or to this command sequence. Moreover, the commands may be issued as batch of commands in a command sequence, such that the graphics processor will process the sequence of commands in at least partially concurrence.

In some embodiments, the graphics processor command sequence 910 may begin with a pipeline flush command 912 to cause any active graphics pipeline to complete the currently pending commands for the pipeline. In some embodiments, the 3D pipeline 922 and the media pipeline 924 do not operate concurrently. The pipeline flush is performed to cause the active graphics pipeline to complete any pending commands In response to a pipeline flush, the command parser for the graphics processor will pause command processing until the active drawing engines complete pending operations and the relevant read caches are invalidated. Optionally, any data in the render cache that is marked 'dirty' can be flushed to memory. In some embodiments, pipeline flush command 912 can be used for pipeline synchronization or before placing the graphics processor into a low power state.

In some embodiments, a pipeline select command 913 is used when a command sequence requires the graphics processor to explicitly switch between pipelines. In some embodiments, a pipeline select command 913 is required only once within an execution context before issuing pipeline commands unless the context is to issue commands for both pipelines. In some embodiments, a pipeline flush command 912 is required immediately before a pipeline switch via the pipeline select command 913.

In some embodiments, a pipeline control command 914 configures a graphics pipeline for operation and is used to program the 3D pipeline 922 and the media pipeline 924. In some embodiments, pipeline control command 914 configures the pipeline state for the active pipeline. In one embodiment, the pipeline control command 914 is used for pipeline synchronization and to clear data from one or more cache memories within the active pipeline before processing a batch of commands.

In some embodiments, commands for the return buffer state 916 are used to configure a set of return buffers for the respective pipelines to write data. Some pipeline operations require the allocation, selection, or configuration of one or more return buffers into which the operations write intermediate data during processing. In some embodiments, the graphics processor also uses one or more return buffers to store output data and to perform cross thread communication. In some embodiments, configuring the return buffer state 916 includes selecting the size and number of return buffers to use for a set of pipeline operations.

The remaining commands in the command sequence differ based on the active pipeline for operations. Based on a pipeline determination 920, the command sequence is tailored to the 3D pipeline 922 beginning with the 3D pipeline state 930 or the media pipeline 924 beginning at the media pipeline state 940.

The commands to configure the 3D pipeline state 930 include 3D state setting commands for vertex buffer state, vertex element state, constant color state, depth buffer state, and other state variables that are to be configured before 3D primitive commands are processed. The values of these commands are determined at least in part based on the particular 3D API in use. In some embodiments, 3D pipeline state 930 commands are also able to selectively disable or bypass certain pipeline elements if those elements will not be used.

In some embodiments, 3D primitive 932 command is used to submit 3D primitives to be processed by the 3D pipeline. Commands and associated parameters that are passed to the graphics processor via the 3D primitive 932 command are forwarded to the vertex fetch function in the graphics pipeline. The vertex fetch function uses the 3D primitive 932 command data to generate vertex data structures. The vertex data structures are stored in one or more return buffers. In some embodiments, 3D primitive 932 command is used to perform vertex operations on 3D primitives via vertex shaders. To process vertex shaders, 3D pipeline 922 dispatches shader execution threads to graphics processor execution units.

In some embodiments, 3D pipeline 922 is triggered via an execute 934 command or event. In some embodiments, a register write triggers command execution. In some embodiments execution is triggered via a 'go' or 'kick' command in the command sequence. In one embodiment, command execution is triggered using a pipeline synchronization command to flush the command sequence through the graphics pipeline. The 3D pipeline will perform geometry processing for the 3D primitives. Once operations are complete, the resulting geometric objects are rasterized and the pixel engine colors the resulting pixels. Additional commands to control pixel shading and pixel back end operations may also be included for those operations.

In some embodiments, the graphics processor command sequence 910 follows the media pipeline 924 path when performing media operations. In general, the specific use and manner of programming for the media pipeline 924 depends on the media or compute operations to be performed. Specific media decode operations may be offloaded to the media pipeline during media decode. In some embodiments, the media pipeline can also be bypassed and media decode can be performed in whole or in part using resources provided by one or more general purpose processing cores. In one embodiment, the media pipeline also includes elements for general-purpose graphics processor unit (GPGPU) operations, where the graphics processor is used to perform SIMD vector operations using computational shader programs that are not explicitly related to the rendering of graphics primitives.

In some embodiments, media pipeline 924 is configured in a similar manner as the 3D pipeline 922. A set of commands to configure the media pipeline state 940 are dispatched or placed into a command queue before the media object commands 942. In some embodiments, commands for the media pipeline state 940 include data to configure the media pipeline elements that will be used to process the media objects. This includes data to configure the video decode and video encode logic within the media pipeline, such as encode or decode format. In some embodiments, commands for the media pipeline state 940 also support the use of one or more pointers to "indirect" state elements that contain a batch of state settings.

In some embodiments, media object commands 942 supply pointers to media objects for processing by the media pipeline. The media objects include memory buffers containing video data to be processed. In some embodiments, all media pipeline states must be valid before issuing a media object command 942. Once the pipeline state is configured and media object commands 942 are queued, the media pipeline 924 is triggered via an execute command 944 or an equivalent execute event (e.g., register write). Output from media pipeline 924 may then be post processed by operations provided by the 3D pipeline 922 or the media pipeline 924. In some embodiments, GPGPU operations are configured and executed in a similar manner as media operations.

Graphics Software Architecture

Figure 10:
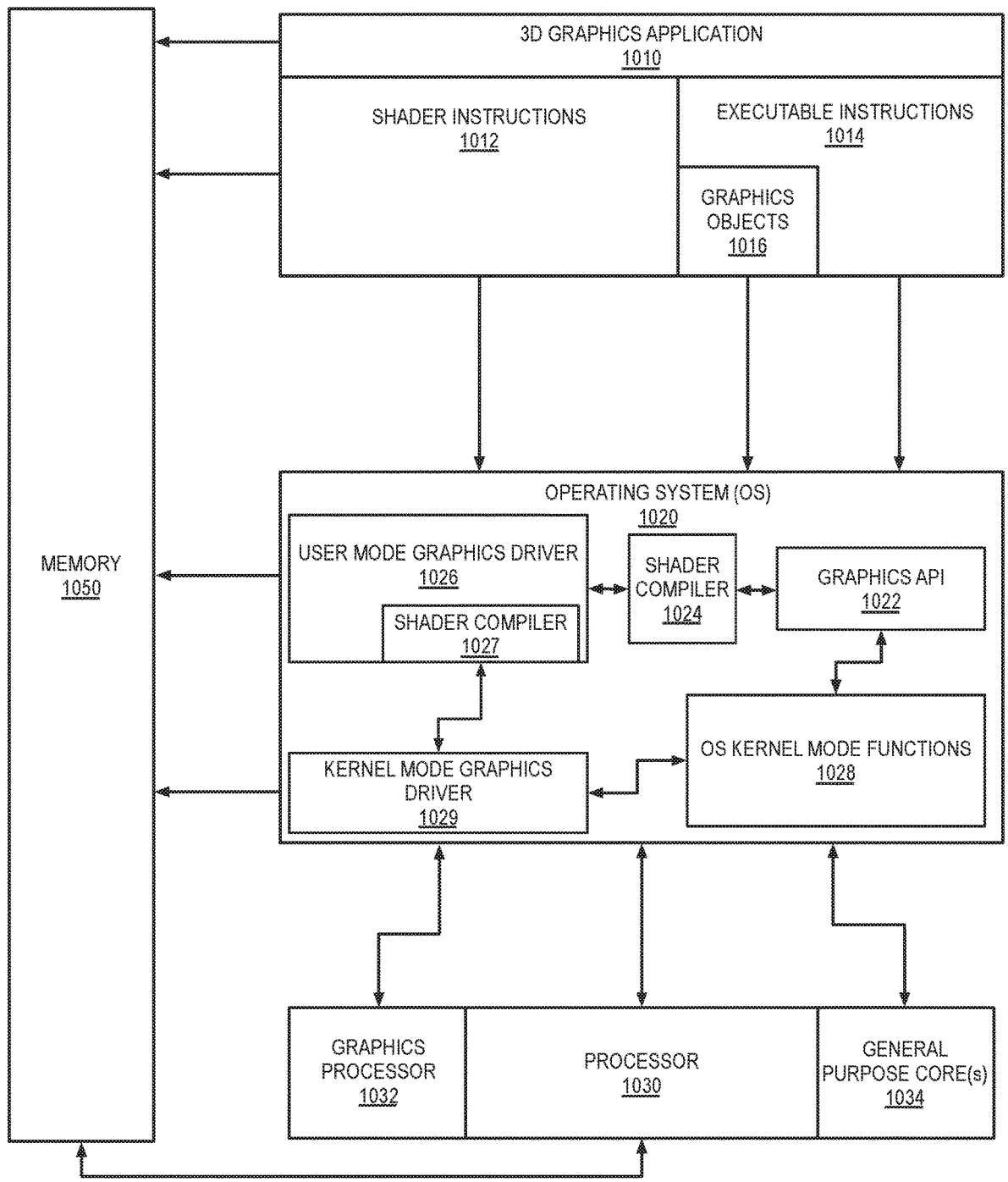
FIG. 10 illustrates exemplary graphics software architecture for a data processing system according to an embodiment.

FIG. 10 illustrates exemplary graphics software architecture for a data processing system 1000 according to some embodiments. In some embodiments, software architecture includes a 3D graphics application 1010, an operating system 1020, and at least one processor 1030. In some embodiments, processor 1030 includes a graphics processor 1032 and one or more general-purpose processor core(s) 1034. The graphics application 1010 and operating system 1020 each execute in the system memory 1050 of the data processing system.

In some embodiments, 3D graphics application 1010 contains one or more shader programs including shader instructions 1012. The shader language instructions may be in a high-level shader language, such as the High Level Shader Language (HLSL) or the OpenGL Shader Language (GLSL). The application also includes executable instructions 1014 in a machine language suitable for execution by the general-purpose processor core 1034. The application also includes graphics objects 1016 defined by vertex data.

In some embodiments, operating system 1020 is a Microsoft® Windows® operating system from the Microsoft Corporation, a proprietary UNIX-like operating system, or an open source UNIX-like operating system using a variant of the Linux kernel. The operating system 1020 can support a graphics API 1022 such as the Direct3D API, the OpenGL API, or the Vulkan API. When the Direct3D API is in use, the operating system 1020 uses a front-end shader compiler 1024 to compile any shader instructions 1012 in HLSL into a lower-level shader language. The compilation may be a just-in-time (JIT) compilation or the application can perform shader pre-compilation. In some embodiments, high-level shaders are compiled into low-level shaders during the compilation of the 3D graphics application 1010. In some embodiments, the shader instructions 1012 are provided in an intermediate form, such as a version of the Standard Portable Intermediate Representation (SPIR) used by the Vulkan API.

In some embodiments, user mode graphics driver 1026 contains a back-end shader compiler 1027 to convert the shader instructions 1012 into a hardware specific representation. When the OpenGL API is in use, shader instructions 1012 in the GLSL high-level language are passed to a user mode graphics driver 1026 for compilation. In some embodiments, user mode graphics driver 1026 uses operating system kernel mode functions 1028 to communicate with a kernel mode graphics driver 1029. In some embodiments, kernel mode graphics driver 1029 communicates with graphics processor 1032 to dispatch commands and instructions.

IP Core Implementations

One or more aspects of at least one embodiment may be implemented by representative code stored on a machine-readable medium which represents and/or defines logic within an integrated circuit such as a processor. For example, the machine-readable medium may include instructions which represent various logic within the processor. When read by a machine, the instructions may cause the machine to fabricate the logic to perform the techniques described herein. Such representations, known as "IP cores," are reusable units of logic for an integrated circuit that may be stored on a tangible, machine-readable medium as a hardware model that describes the structure of the integrated circuit. The hardware model may be supplied to various customers or manufacturing facilities, which load the hardware model on fabrication machines that manufacture the integrated circuit. The integrated circuit may be fabricated such that the circuit performs operations described in association with any of the embodiments described herein.

Figure 11:
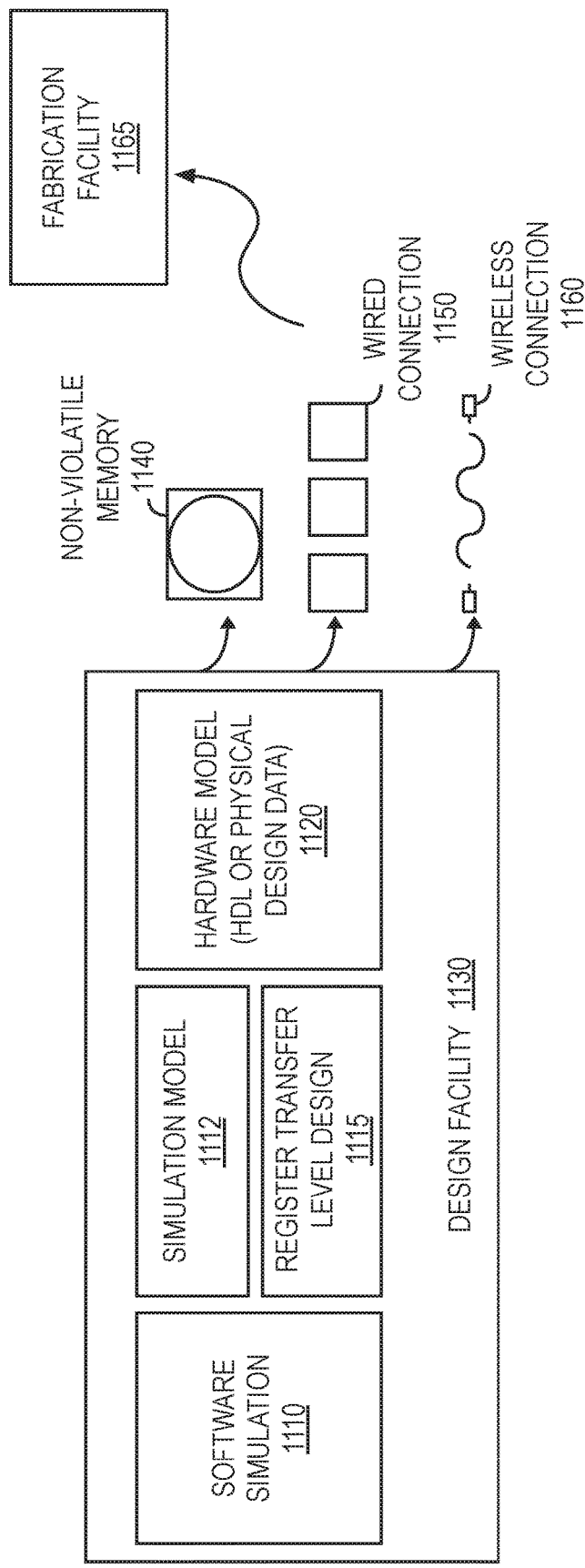
FIG. 11 illustrates an exemplary IP core development system that may be used to manufacture an integrated circuit to perform operations according to an embodiment.

FIG. 11 is a block diagram illustrating an IP core development system 1100 that may be used to manufacture an integrated circuit to perform operations according to an embodiment. The IP core development system 1100 may be used to generate modular, re-usable designs that can be incorporated into a larger design or used to construct an entire integrated circuit (e.g., an SOC integrated circuit). A design facility 1130 can generate a software simulation 1110 of an IP core design in a high level programming language (e.g., C/C++). The software simulation 1110 can be used to design, test, and verify the behavior of the IP core using a simulation model 1112. The simulation model 1112 may include functional, behavioral, and/or timing simulations. A register transfer level (RTL) design 1115 can then be created or synthesized from the simulation model 1112. The RTL design 1115 is an abstraction of the behavior of the integrated circuit that models the flow of digital signals between hardware registers, including the associated logic performed using the modeled digital signals. In addition to an RTL design 1115, lower-level designs at the logic level or transistor level may also be created, designed, or synthesized. Thus, the particular details of the initial design and simulation may vary.

The RTL design 1115 or equivalent may be further synthesized by the design facility into a hardware model 1120, which may be in a hardware description language (HDL), or some other representation of physical design data. The HDL may be further simulated or tested to verify the IP core design. The IP core design can be stored for delivery to a 3rd party fabrication facility 1165 using non-volatile memory 1140 (e.g., hard disk, flash memory, or any non-volatile storage medium). Alternatively, the IP core design may be transmitted (e.g., via the Internet) over a wired connection 1150 or wireless connection 1160. The fabrication facility 1165 may then fabricate an integrated circuit that is based at least in part on the IP core design. The fabricated integrated circuit can be configured to perform operations in accordance with at least one embodiment described herein.

Exemplary System on a Chip Integrated Circuit

Figure 12:
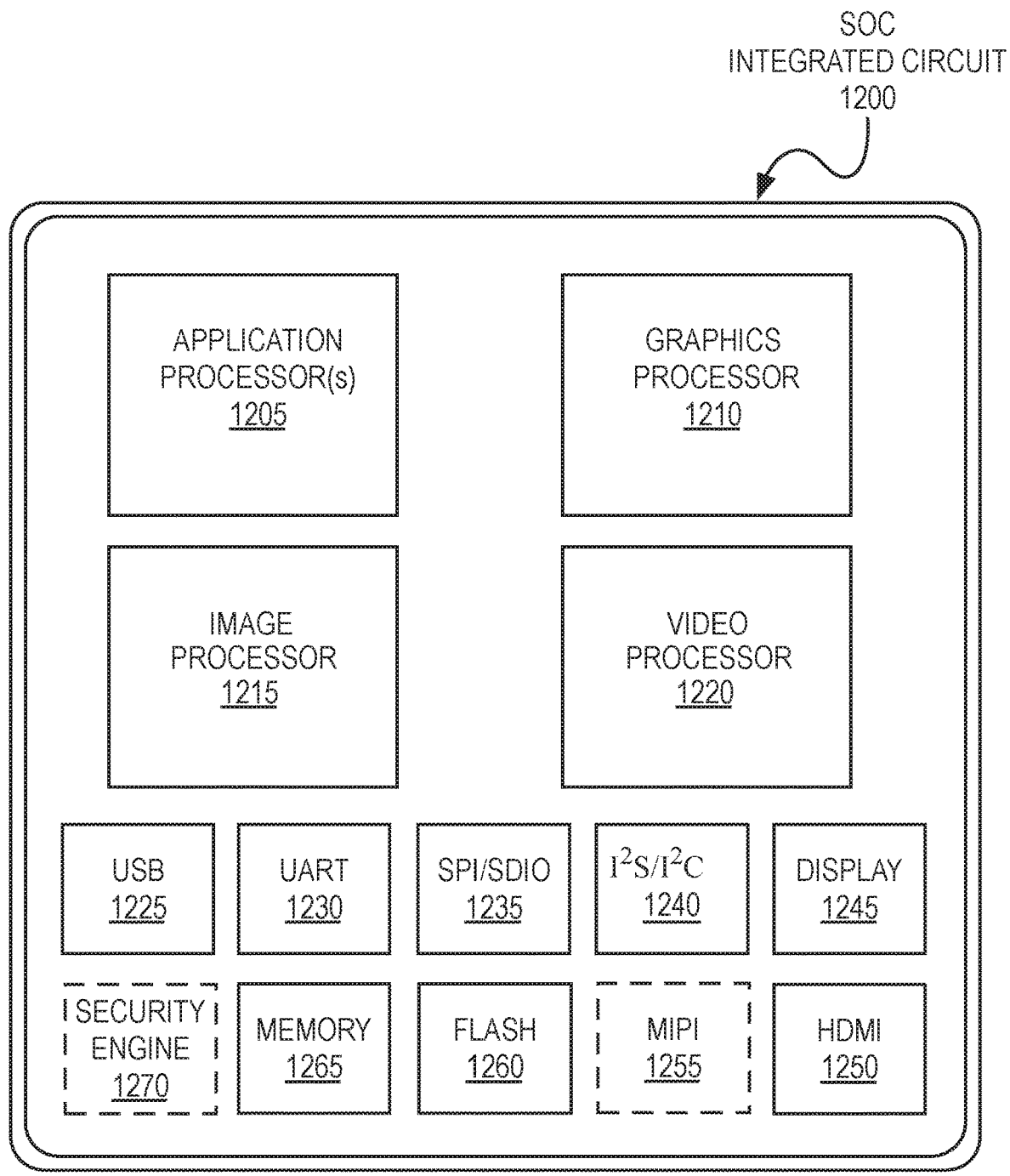
FIG. 12 illustrates an exemplary system on a chip integrated circuit that may be fabricated using one or more IP cores, according to an embodiment.
Figure 13:
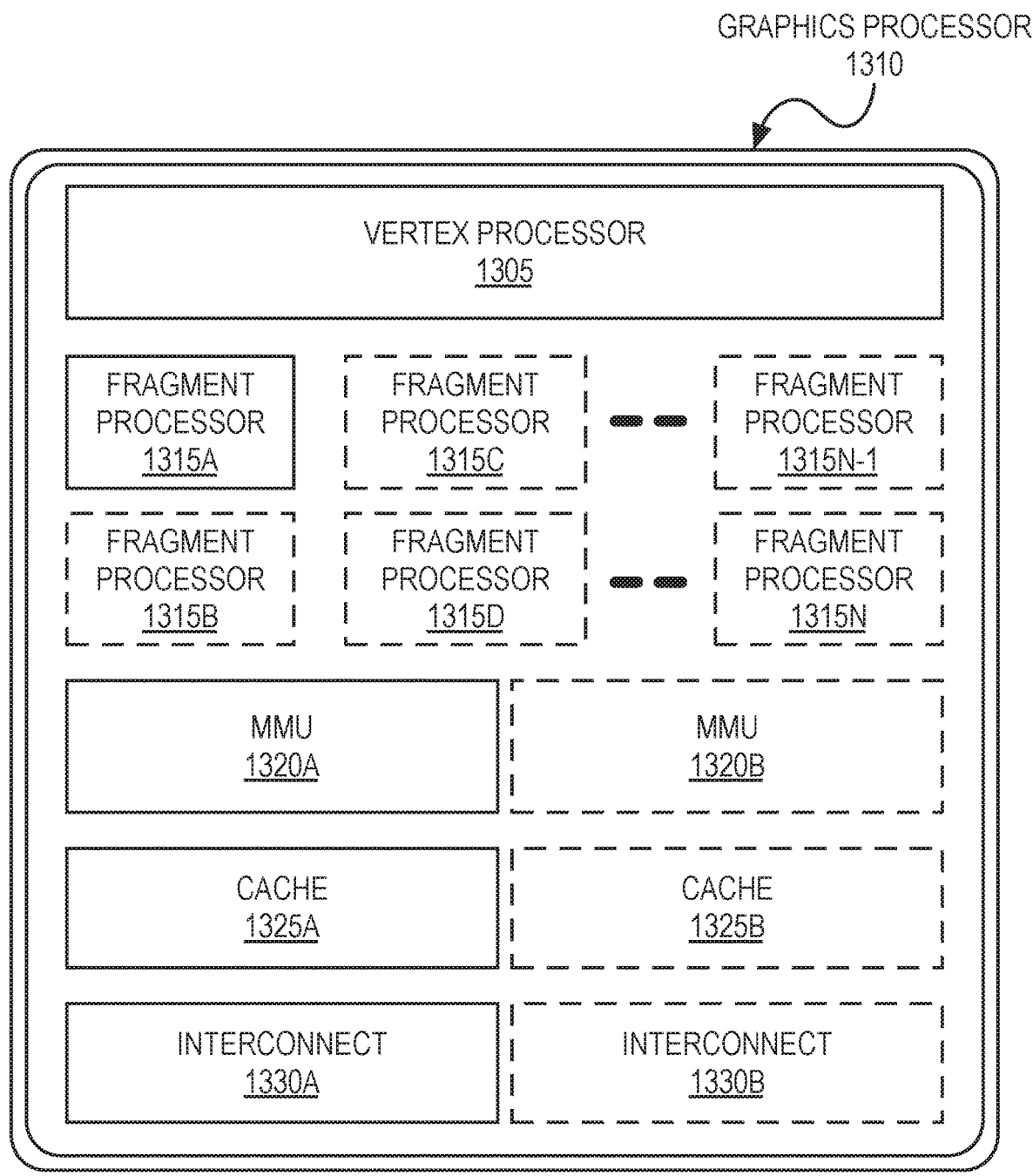
FIG. 13 illustrates an exemplary graphics processor of a system on a chip integrated circuit that may be fabricated using one or more IP cores.
Figure 14:
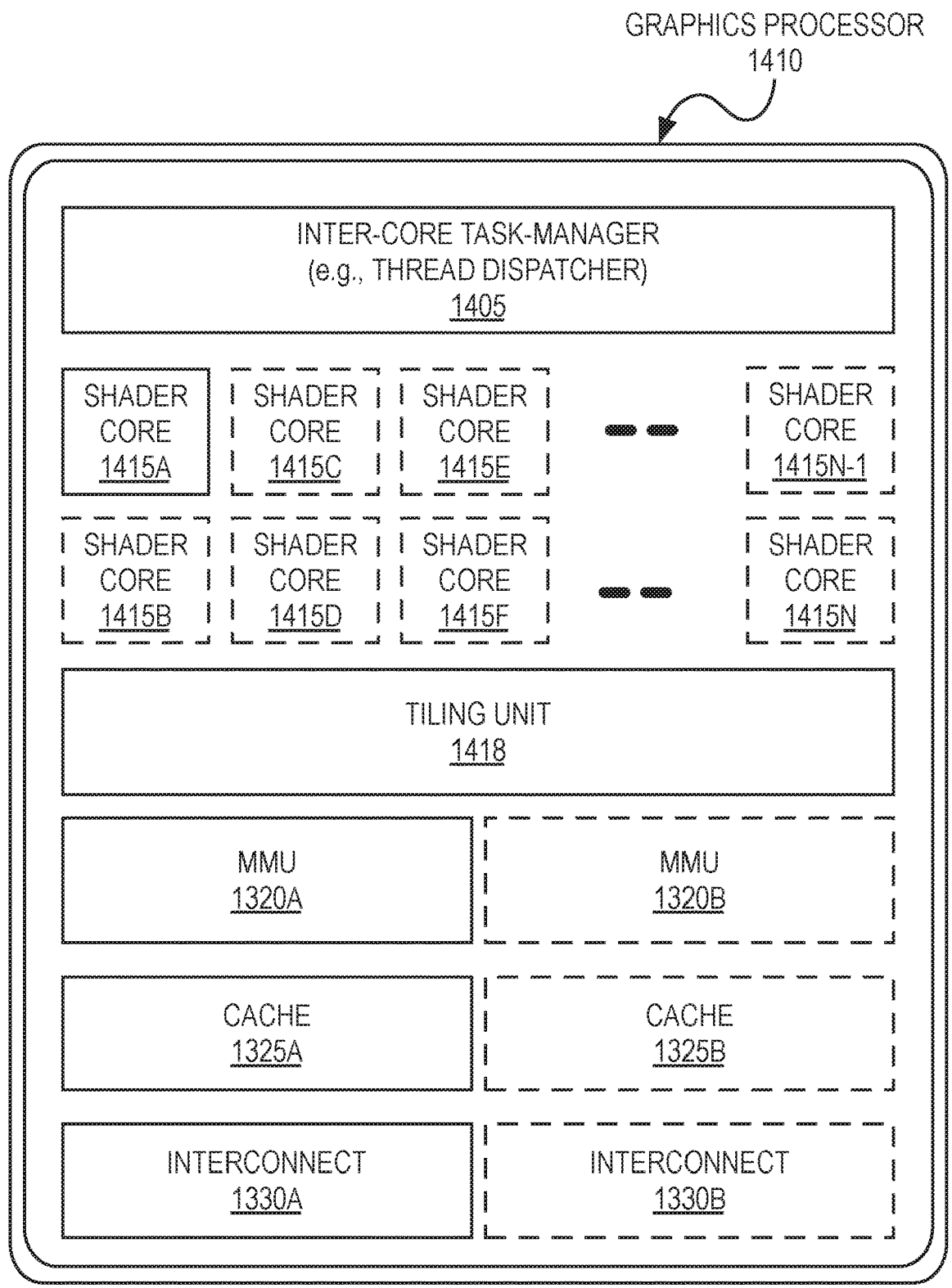
FIG. 14 illustrates an additional exemplary graphics processor of a system on a chip integrated circuit that may be fabricated using one or more IP cores

FIGS. 12-14 illustrate exemplary integrated circuits and associated graphics processors that may be fabricated using one or more IP cores, according to various embodiments described herein. In addition to what is illustrated, other logic and circuits may be included, including additional graphics processors/cores, peripheral interface controllers, or general purpose processor cores.

FIG. 12 is a block diagram illustrating an exemplary system on a chip integrated circuit 1200 that may be fabricated using one or more IP cores, according to an embodiment. Exemplary integrated circuit 1200 includes one or more application processor(s) 1205 (e.g., CPUs), at least one graphics processor 1210, and may additionally include an image processor 1215 and/or a video processor 1220, any of which may be a modular IP core from the same or multiple different design facilities. Integrated circuit 1200 includes peripheral or bus logic including a USB controller 1225, UART controller 1230, an SPI/SDIO controller 1235, and an I2S/I2C controller 1240. Additionally, the integrated circuit can include a display device 1245 coupled to one or more of a high-definition multimedia interface (HDMI) controller 1250 and a mobile industry processor interface (MIPI) display interface 1255. Storage may be provided by a flash memory subsystem 1260 including flash memory and a flash memory controller. Memory interface may be provided via a memory controller 1265 for access to SDRAM or SRAM memory devices. Some integrated circuits additionally include an embedded security engine 1270.

FIG. 13 is a block diagram illustrating an exemplary graphics processor 1310 of a system on a chip integrated circuit that may be fabricated using one or more IP cores, according to an embodiment. Graphics processor 1310 can be a variant of the graphics processor 1210 of FIG. 12. Graphics processor 1310 includes a vertex processor 1305 and one or more fragment processor(s) 1315A1315N (e.g., 1315A, 1315B, 1315C, 1315D, through 1315N-1, and 1315N). Graphics processor 1310 can execute different shader programs via separate logic, such that the vertex processor 1305 is optimized to execute operations for vertex shader programs, while the one or more fragment processor(s) 1315A-1315N execute fragment (e.g., pixel) shading operations for fragment or pixel shader programs. The vertex processor 1305 performs the vertex processing stage of the 3D graphics pipeline and generates primitives and vertex data. The fragment processor(s) 1315A-1315N use the primitive and vertex data generated by the vertex processor 1305 to produce a framebuffer that is displayed on a display device. In one embodiment, the fragment processor(s) 1315A-1315N are optimized to execute fragment shader programs as provided for in the OpenGL API, which may be used to perform similar operations as a pixel shader program as provided for in the Direct 3D API.

Graphics processor 1310 additionally includes one or more memory management units (MMUs) 1320A-1320B, cache(s) 1325A-1325B, and circuit interconnect(s) 1330A-1330B. The one or more MMU(s) 1320A-1320B provide for virtual to physical address mapping for graphics processor 1310, including for the vertex processor 1305 and/or fragment processor(s) 1315A-1315N, which may reference vertex or image/texture data stored in memory, in addition to vertex or image/texture data stored in the one or more cache(s) 1325A-1325B. In one embodiment the one or more MMU(s) 1320A-1320B may be synchronized with other MMUs within the system, including one or more MMUs associated with the one or more application processor(s) 1205, image processor 1215, and/or video processor 1220 of FIG. 12, such that each processor 1205-1220 can participate in a shared or unified virtual memory system. The one or more circuit interconnect(s) 1330A-1330B enable graphics processor 1310 to interface with other IP cores within the SoC, either via an internal bus of the SoC or via a direct connection, according to embodiments.

FIG. 14 is a block diagram illustrating an additional exemplary graphics processor 1410 of a system on a chip integrated circuit that may be fabricated using one or more IP cores, according to an embodiment. Graphics processor 1410 can be a variant of the graphics processor 1210 of FIG. 12. Graphics processor 1410 includes the one or more MMU(s) 1320A-1320B, cache(s) 1325A-1325B, and circuit interconnect(s) 1330A-1330B of the integrated circuit 1300 of FIG. 13.

Graphics processor 1410 includes one or more shader core(s) 1415A-1415N (e.g., 1415A, 1415B, 1415C, 1415D, 1415E, 1415F, through 1315N-1, and 1315N), which provides for a unified shader core architecture in which a single core or type or core can execute all types of programmable shader code, including shader program code to implement vertex shaders, fragment shaders, and/or compute shaders. The exact number of shader cores present can vary among embodiments and implementations. Additionally, graphics processor 1410 includes an inter-core task manager 1405, which acts as a thread dispatcher to dispatch execution threads to one or more shader core(s) 1415A-1415N and a tiling unit 1418 to accelerate tiling operations for tile-based rendering, in which rendering operations for a scene are subdivided in image space, for example to exploit local spatial coherence within a scene or to optimize use of internal caches.

Apparatus and Method for Optimized Ray Tracing

Figure 15:
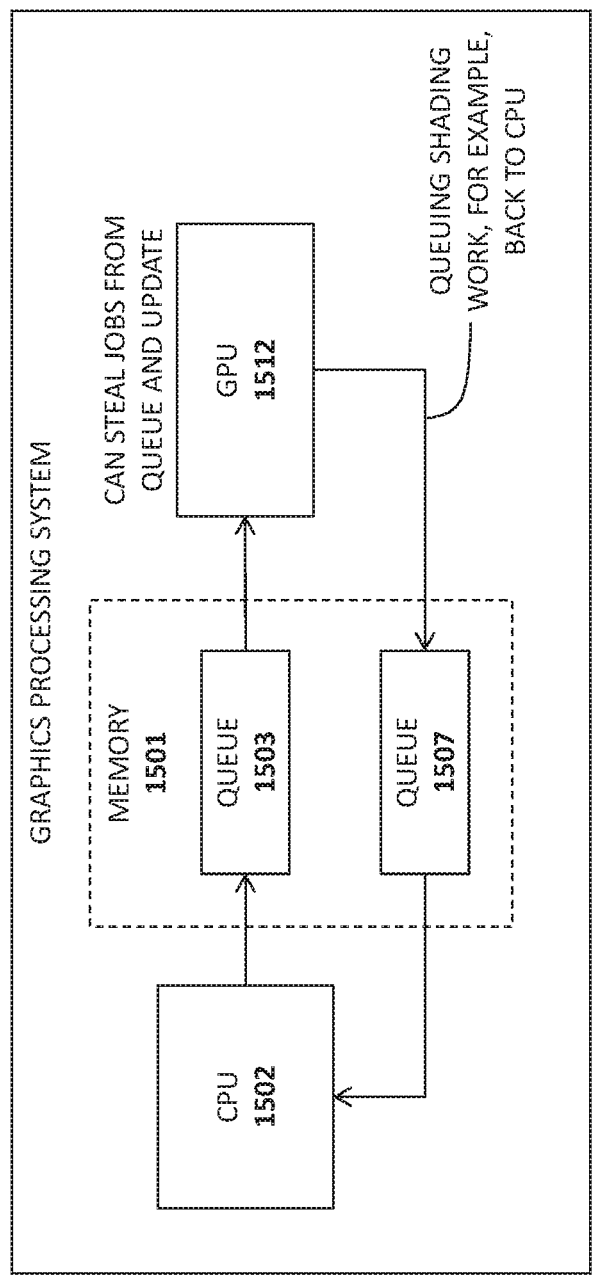
FIG. 15 illustrates one embodiment of an architecture for tile-based immediate mode rendering (TBIMR)

Stream-based ray tracing often incurs a performance win compared to more traditional ray tracing. A "stream" is a set of rays. In a heterogeneous system, one wants to exploit the resources as best as possible. In one embodiment illustrated in FIG. 15, to speed up the processing of rays, hardware-supported queues 1503, 1507 (which may be regions allocated in memory 1501) are added between, for example, the CPU 1502 and GPU 1512 to improve ray processing efficiency.

The CPU 1502 may, for example, generate eye ray streams (which is a job) and put them in a hardware supported queue 1503. The EUs on the GPU 1512 can then steal jobs (consisting of the ray streams) from that queue 1503 with a negligible penalty. That is, a task is started on each EU, which is to perform ray tracing, and the EU keeps working on this and stealing jobs from the queue 1503 until a signal is sent through the queue that the EU is to terminate. Normally, one would start a task for each ray stream, and this costs a lot of overhead.

Similarly, in one embodiment, the GPU 1512 can add jobs to a queue 1507 pointing in the other direction, i.e., from the GPU 1507 to the CPU 1502. This could be a shading job, for example, or even a ray tracing job. This may be done, for example, in cases where the GPU 1512 cannot process ray streams fast enough and the CPU 1502 is idle.

In one embodiment, a ray stream in the queue 1503 from CPU 1502 to GPU 1512 is merely a pointer to where the ray stream starts and also how large the ray stream is. A job in the other queue 1507 (from GPU to CPU), can be more general. For example, in one embodiment, it consists of a pointer to where the data is located, a size, and a type. To be more general, both queues can be configured in this manner.

In one embodiment, to make accesses more efficient, prefetching is done in a new way. Initially focusing on the queue 1503 from the CPU 1502 to the GPU 1512, assume that an EU has work to be done right now, but it is getting almost ready (say it has N rays left to process out of M, which the ray stream had to start with).

At this point, the EU could instruct the queue 1503 to prefetch the rays (or more generally, the data) that the next job in the queue points to. So assuming the next jobs contains a ray stream, with M rays in it, these rays will be fetched from memory into the cache hierarchy when the EU instructs that queue that it will handle that next job in the queue. So, we are talking about a prefetching a set of data (e.g., all the rays in a ray stream), instead of just prefetching a cache line.

Figure 16:
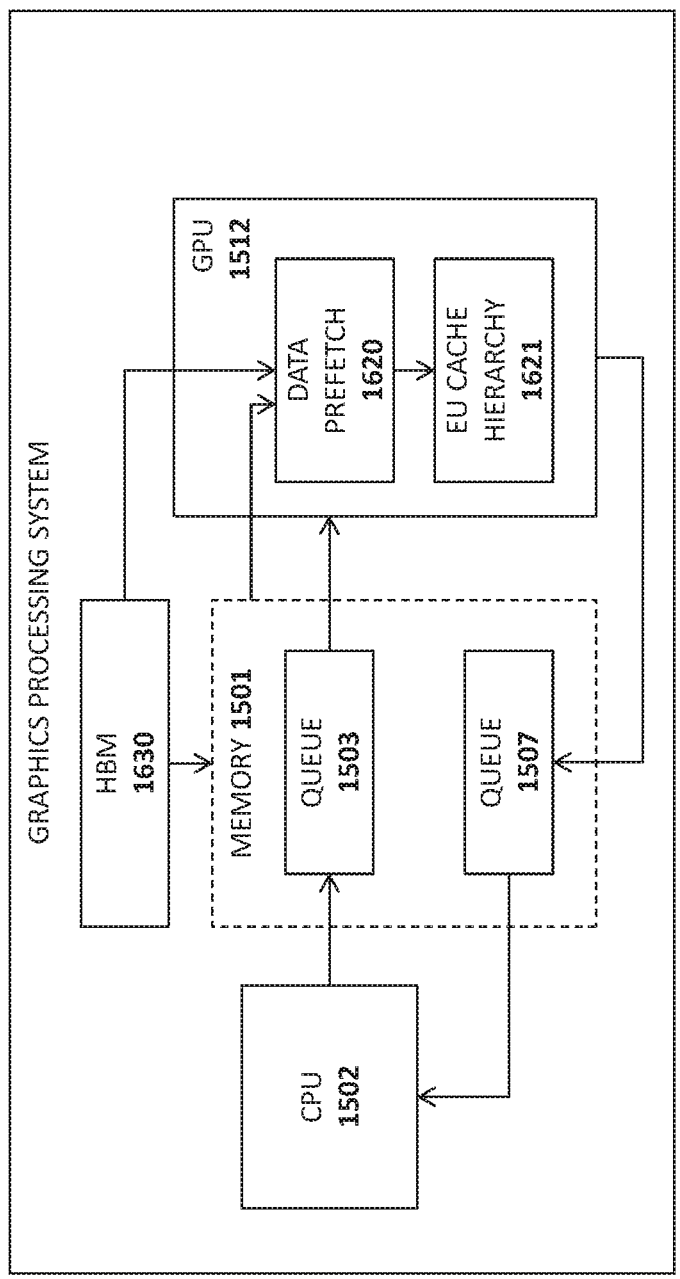
FIG. 16 illustrates one embodiment of on-chip memory buffers including pointer queues for each tile and geometry data buffers.

FIG. 16 illustrates one embodiment in which a data prefetch circuit 1620 prefetches ray streams and/or associated data from a high-bandwidth memory 1630 and/or system memory 1501 (e.g., DRAM) and stores the prefetched data within the EU cache hierarchy 1621 so that it is available when the EUs are ready to process the next job. Prefetching can be done from HBM 1630 to DRAM 1501, or from HBM 1630 to the cache hierarchy 1621 and/or from DRAM 1501 to cache hierarchy 1621. There are endless variants, and this just depends on the architecture. The idea is to prefetch a batch of data so that this data is available exactly when the EU (in this example) needs the data, i.e., it has finished processing the remaining N rays in the ray stream. This will significantly improve performance. This entire system with queues could also be applied from one HPC (high performance compute) node to another HPG node (and back). To prefetch more than a cache line, a prefetch area instruction may be used (i.e., to prefetch from a designated region in memory). As mentioned, if the CPU 1502 has available resources, the GPU 1512 can also submit shading jobs for the CPU to complete.

Apparatus and Method for Decompressing a Bounding Volume Hierarchy

Ray tracing is an important application that is always accelerated by using a spatial data structure, which may be a kd-tree, a bounding volume hierarchy (BVH), grid, octree, etc (although the best known techniques use BVHs today). While important for performing ray traversals, reading BVH nodes incurs memory traffic. To reduce this memory traffic, it is common to compress the nodes of the BVH, typically by quantizing multiple nodes' coordinates relative to a common parent node, and to then decompress those nodes on the fly during traversal. While doing this can save bandwidth, the compute cost for decompressing the nodes in software can be substantial, and negate most (if not all) of the bandwidth gains.

In one embodiment, special instructions are added to a CPU and/or to the compute units in a graphics processor that significantly reduces the cost of performing this BVH node decompression. These compute units of graphics processors are referred to herein as execution units, or EUs. With such special instructions, the speed of ray traversal through a BVH can be significantly increased. This is a fundamental operation that is performed millions or billions times per frame (with each such traversal requiring on the order of 100 s of such BVHs node for decompression). While the focus of the present application is BVHs, the disclosed instructions may potentially be used with data structures other than the BVH—or for other BVH-based algorithms such as nearest-neighbor queries or collision detection.

A box in a BVH is almost always axis-aligned, and as such a box can be represented using (X min, Y min, Z min, X max, Y max, Z max), where (X min, Y min, Z min) is the minimum point of the box, and (X max, Y max, Z max) is the maximum point of the box.

In general, the BVH is a tree structure containing internal nodes and leaf nodes, with each node storing a bounding box as described above. Leaf nodes contain (references to) geometric primitives, and have their bounding box set to a box that tightly encloses those geometric primitives. Internal nodes contain a number of child nodes (typically through a pointer or list of pointers to those nodes); their bounding box is set to (recursively) envelop all child nodes' bounding boxes. Traversal algorithms—either for ray tracing or similar techniques such as collision detection, nearest neighbor queries, etc—use this hierarchical tree structure to perform some sort of branch-and-bound traversals in which, in each traversal step, a query object (a ray, query box, etc) is compared to a BVH node's bounding box, and either processing or culling the respective subtree based on the outcome of this overlap test. Ray tracing requires millions to billions of ray-BVH traversals per frame, each requiring many ray-box tests.

While very effective in culling, accessing up to hundreds of BVH nodes per ray incurs significant memory bandwidth. To achieve better performance, one may compress the BVH, which has been previously proposed by several authors. Typically, this compression is done by quantizing the coordinates of the bounding box relative to a common known parent box (such as the box of the parent node, the box of a subtree, etc). For example, looking for now only at the X dimension (i.e., at the X min and X max coordinates of the box) these two coordinates can be compressed relative its parent (parent Min X, parent Min Y, parent Min Z and parent Max X, parent Max Y, parent Max Z). Since child nodes are guaranteed to be fully enclosed in their parent box, it is common to express the child box relative to this parent box.

The most common way to encode min X and max X is to store (or compute using decompression) parent Min and then store (or compute as part of decompression) a scale factor, scale=(scaleX, scaleY, scaleZ), where the first term is computed as:

$$\text{scale}X = (\text{parent Max } X - \text{parent Min } X)/2n,$$

and similarly for scaleY and scaleZ, and where n is the number of bits that we quantize the child box to. So, assuming we have parent Min and scale for one node, then we store n bits for each using (X min, Y min, Z min, X max, Y max, Z max) of that child. A common value for n is 8, which is substantially cheaper than storing them each in 32 bits (in fact, even 4 bits are often sufficient). We call these quantized values (QX min, QY min, QZ min, QX max, QY max, QZ max).

To decompress X min and X max, one would then compute:

$$X \text{ min} = \text{parent Min } X + \text{scaleX} * QX \text{ min};$$

$$X \text{ max} = \text{parent Min } X + \text{scaleX} * (2n - QX \text{ max})$$

These can in general be implemented by using multiply-and-add instructions (MAD) such as:

$$X \text{ min} = \text{MAD}(\text{scale}X, QX \text{ min}, \text{parent Min } X);$$

$$X \text{ max} = \text{MAD}(\text{scale}X, (2n - QX \text{ max}), \text{parent Min } X);$$

In addition, the quantized values are often stored together, 4 in 32 bits, for example, and hence, one often needs to compute QX min as:

$$(T\&0x0000FF00) \gg 8,$$

Assuming that four values are stored in T (32 bits) and that QX min is in the next to lowest byte, which is the reason to AND (&) with 0x0000FF00, it is then shifted down by 8 bits to get the value in the lower eight bits.

One embodiment of the invention includes special instructions that make this entire process of computing (X min, Y min, Z min, X max, Y max, Z max) much faster. One instruction, which is described first, may be used to either decompress a min value (e.g., X min) or a max value (e.g., X max), but not both at the same time. A hardware unit for performing these operations is described below with respect to FIG. 17.

It is assumed that the instruction has the following setup, where in-parameters have an I appended to the names, and the out-parameter has an O appended: DCMP1 resultO, scald, parent Min I, QvaluesI, whichI. Note that all parameters are scalar values and are explained below:

resultO: This is the computed result that is generated when executing this instruction. This could be either a min value or a max value (e.g., X min or Z max).

scaleI: This is the scale value for the dimension to decompress, so to decompress in X this parameter is set to the scaleX, etc.

parentMinI: This is the parent Min value for the dimension to decompress, so to decompress in X this parameter is set to the parent Min X, etc.

QvaluesI: This may be 32 bits of quantized min and max-values.

WhichI: This is just a few bits that indicate what value is needed to extract from QvaluesI. There are at most 6 values (min and max in X,Y,Z) and so only three bits are needed for this.

Figure 17:
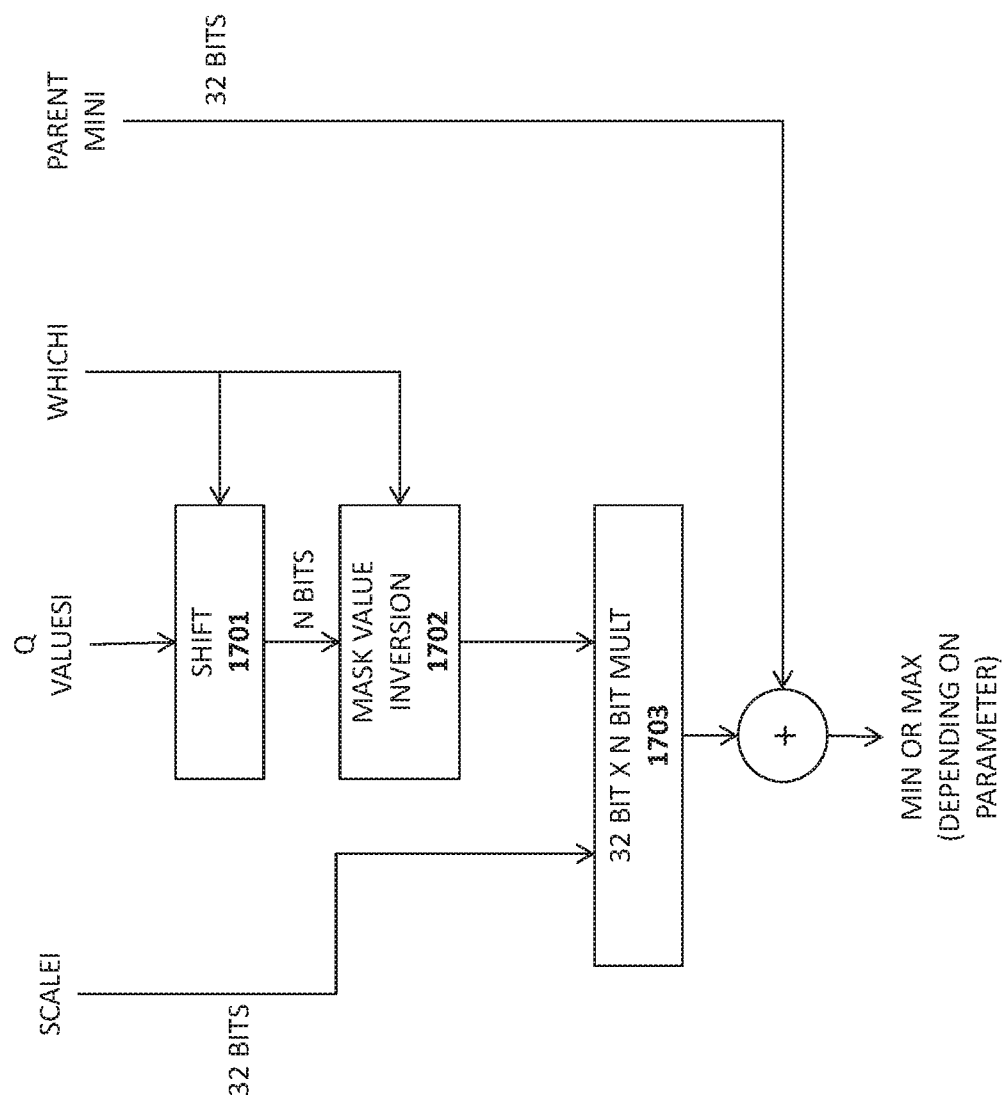
FIG. 17 illustrates a method in accordance with one embodiment of the invention.

FIG. 17 illustrates one embodiment implemented in hardware (where the in-parameters are shown at the top) and the result is shown at the bottom (either a min or a max value depending on the parameters. Note that we want to implement the equations from above, which are repeated here:

$$X \text{ min} = \text{parent Min } X + \text{scaleX} * QX \text{ min};$$

$$X \text{ max} = \text{parent Min } X + \text{scaleX} * (2n - QX \text{ max})$$

If whichI indicates that a min value is to be computed when the first row of the two equations above are to be executed, and if whichI indicates that a max value is to be computed, then we want to execute the second row. Note that QvaluesI contain the quantized values, and that whichI indicates which quantized values need to be extracted from QvaluesI. Hence, there is a shift unit 1701 that shifts an appropriate amount of QvaluesI depending on whichI. Then the n lower bits out from the shift unit 1701 are used. If whichI indicates that it is a max value that we want to compute, then the invert unit 1702 inverts all the bits (which is equivalent to 2n–Q max, but more efficient), otherwise the bits just pass through the invert unit 1702. Next follows a 32 bits X an n bits multiplication unit 1703. Since n may be only 8 bits, this unit can be made smaller than a general 32×32 multiplication unit. Finally, the result from the multiplication is added together with the parentMinI value, as illustrated, resulting in either a decompression min-value or a decompressed max value.

Figure 18:
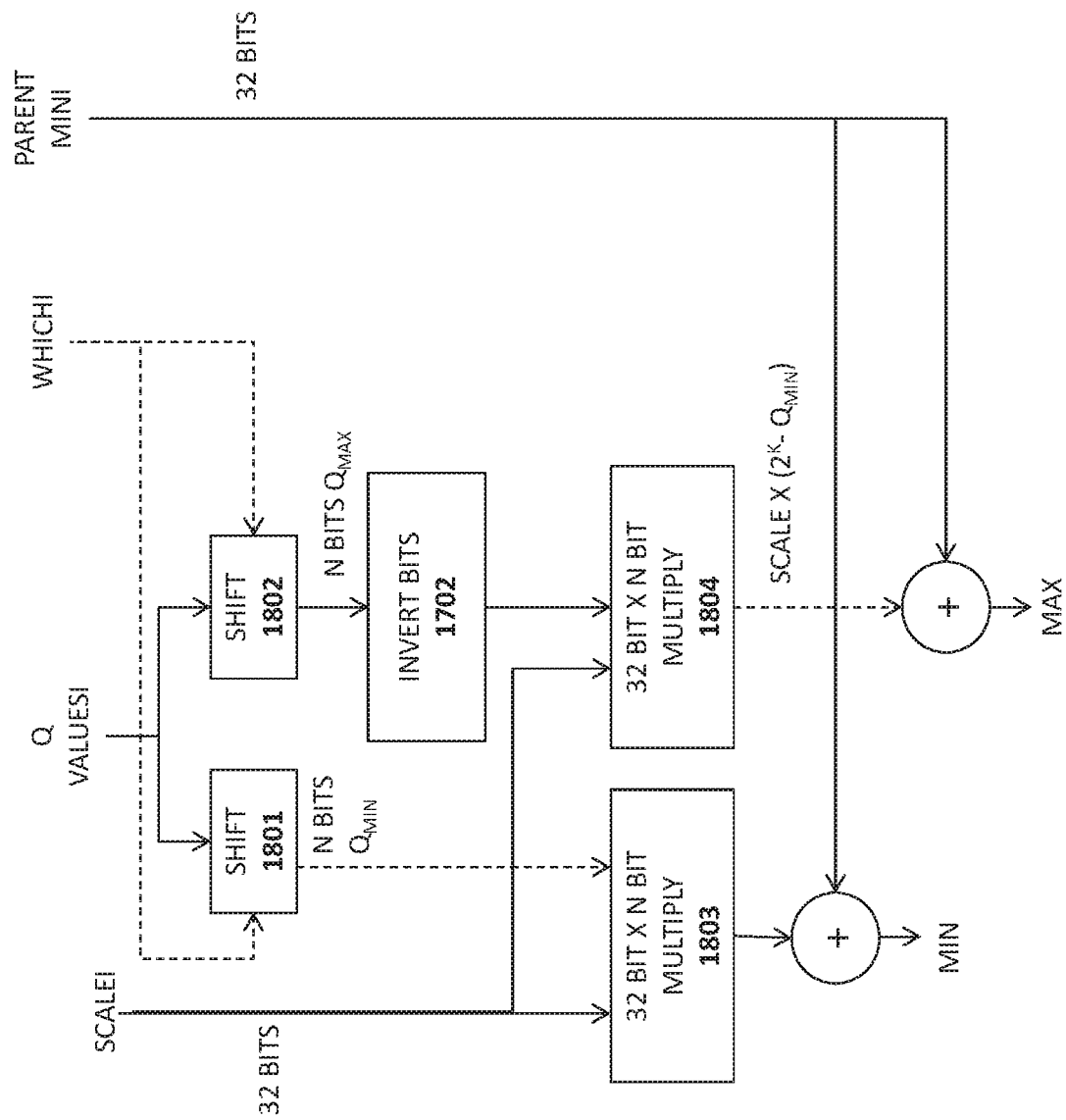
FIG. 18 illustrates a geometry processing module and a pixel processing module in accordance with one embodiment of the invention.

Another embodiment, illustrated in FIG. 18, computes both the min and max at the same time. This embodiment includes two shift units 1801-1801, the first 1801 to shift Q values to generate N bits for Q min and the second 1802 to shift the Q values to generate N bits for Q max. Inversion unit 1702 inverts the N bits for Q max as described above, which is input to 32×n bit multiplier 1804 to be multiplied by the scald value and generate SCALE X ($2^K$–Q MIN) which is the added to parent min I value to generate the MAX value. At the same time, another 32×N bit multiplier 1803 multiplies scald with N bits Q MIN provided from shift unit 1801 to generate a result which is then added to parentI value to generate the MIN value.

Apparatus and Method Including Instructions and Circuitry for Efficient Ray Tracing To improve ray tracing efficiency, one embodiment of the invention includes special instructions added to the instructions set in a CPU and/or in a GPU (in the EUs, for example). This provides faster ray tracing in the graphics processor (since the EU will be faster) and/or in the CPU.

In ray tracing, there are certain operations that are executed billions of times for a single image. When using a bounding volume hierarchy (which is the most commonly used spatial data structure today), for example, a core routine that is being executed is a ray against box intersection. Instructions are provided below that make this operation faster. In particular, one embodiment comprises combined min-max instructions in a novel form. In addition, a gather cache is described which stores data from individual cache lines so that if successive gather addresses are in same cache line, they will be available locally.

One operation that is done six times for each ray-versus-box intersection test is a min-max operation or a max-min operation. For example, some current architectures have V MIN_MAX and V MAX_MIN instructions that do this. They can be expressed as:

$$V \text{ min\_max}(a,b,c) = \text{min}(\text{max}(a,b),c)$$

$$V \text{ max\_min}(a,b,c) = \text{max}(\text{min}(a,b),c)$$

The entire ray-box intersection then consists of some computations at first, followed by 3 min-max and 3 max-min operations. This is an improvement from doing 6 min and 6 max operations, which would otherwise be done.

However, these computations can be expressed as:

$$\text{max } 4(t \text{ min } ray, \text{min}(x0,x1), \text{min}(y0,y1), \text{min } 2(z0,z1)) \qquad (*)$$

$$\text{min } 4(t \text{ max } ray, \text{max}(x0,x1), \text{max}(y0,y1), \text{max}(z0,z1)) \qquad (**)$$

In one embodiment of the invention, the following two variants are implemented to support the above:

Variant 1:

In this embodiment, a separate instruction is provided for each of these functions. One embodiment of the instructions include the following:

$$\text{max 4 min } 3(a,b,c,d,e,f,g) = \text{max } 4(a,\text{min}(b,c),\text{min}(d,e),\text{min } 2(f,g))$$

$$\text{min 4 max } 3(a,b,c,d,e,f,g) = \text{min } 4(a,\text{max}(b,c),\text{max}(d,e),\text{max}(f,g))$$

Note that the a-parameter would be t min ray for max 4 min 3 and t max ray for min 4 max 3. One possible disadvantage is that there are too many arguments to the instruction. However, AVX2 instructions can easily support several SIMD-registers with 8 floating point registers each, so this can be implemented using current architectures. Embodiments of hardware implementations for the above instructions are illustrated in FIG. 19 (max 4 min 3) and FIG. 20 (min 4 max 3).

Figure 19:
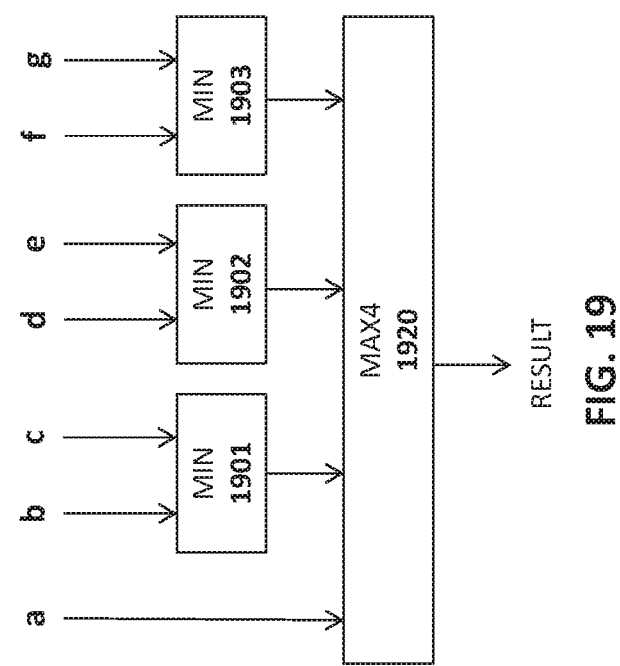
FIG. 19 illustrates a method in accordance with one embodiment of the invention.
Figure 20:
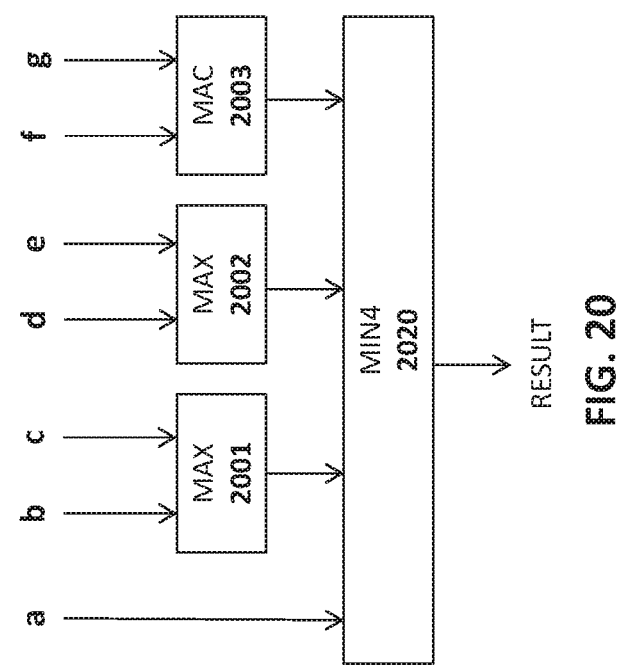
FIG. 20 illustrates how bounding boxes are compared to depth values in one embodiment of the invention.

In particular, in FIG. 19, MIN units 1901-1903 perform the functions min(b,c), min(d,e), and min 2(f,g). MAX 4 unit 1920 then performs the operation max 4(a, min(b,c), min(d,e), min 2(f,g)) to generate the result. Similarly, in FIG. 20, MIN units 2001-2003 perform the functions max(b,c), max(d,e), and max(f,g). MIN 4 unit 2020 then performs the operation min 4(a, max(b,c), max(d,e), max(f,g)).

Variant 2:

In this embodiment, one mega-instruction is used for everything (since a lot of computations can be shared). One embodiment takes the form:

$$\min \max 4 \min \max 3(a,b,c,d,e,f,g,h) = (\max 4(a, \min(b,c), \min(d,e), \min 2(f,g), \min 4(h, \max(b,c), \max(d,e), \max(f,g))$$

Figure 21:
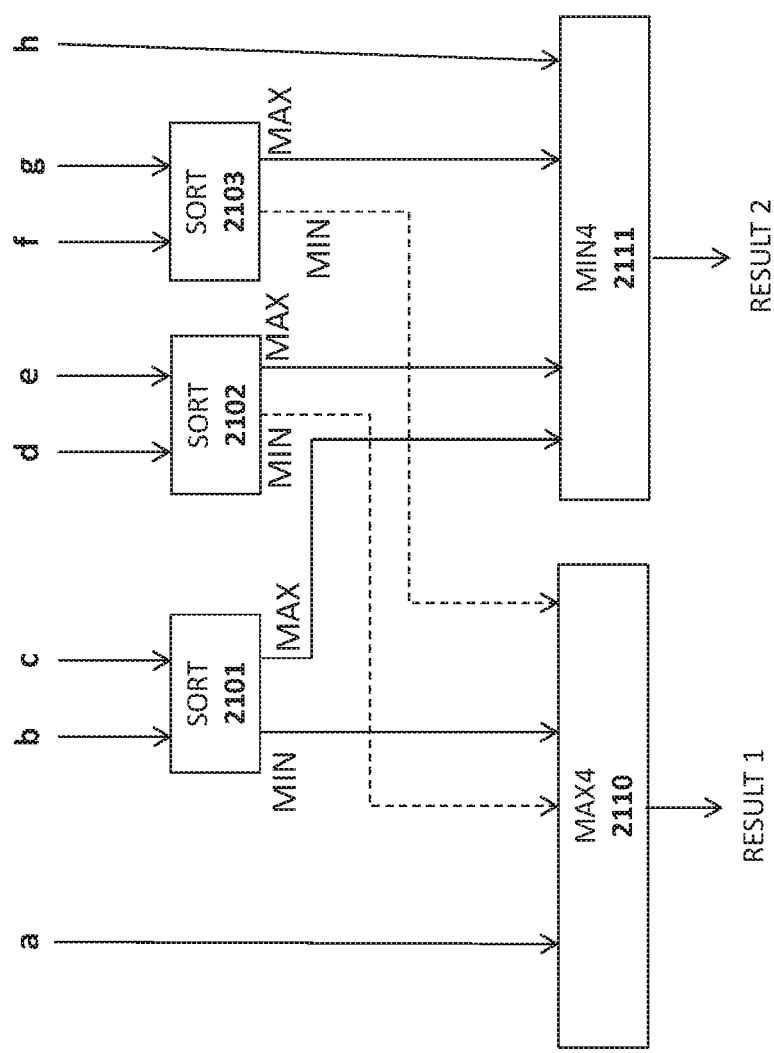
FIG. 21 illustrates sub-tile status in relation to sub-tile depth values.

Note that the a-parameter would be t min ray and the h-parameter would be the h-parameter in this case. Note that since we need to perform both equation (*) and (**) for this variant, this means that we need to compute both min(b,c) and max(b,c), for example. This simply means that we need to sort b and c so that after the sort, b<=c. This can be done much more efficiently that one min and one max evaluation. A proposal for a hardware implementation of this instruction is shown in FIG. 21.

In particular, a plurality of sort units 2101-2103 output all MIN values to the MAX 4 unit 3110 and output all MAX values to the MIN 4 unit 2111, generating two results, only one of which may be utilized depending on the operation being performed.

In addition, one embodiment includes a gather cache which stores data from individual cache lines so that if successive gather addresses are in same cache line, they will be available locally.

The terms "module," "logic," and "unit" used in the present application, may refer to a circuit for performing the function specified. In some embodiments, the function specified may be performed by a circuit in combination with software such as by software executed by a general purpose processor.

Embodiments of the invention may include various steps, which have been described above. The steps may be embodied in machine-executable instructions which may be used to cause a general-purpose or special-purpose processor to perform the steps. Alternatively, these steps may be performed by specific hardware components that contain hardwired logic for performing the steps, or by any combination of programmed computer components and custom hardware components.

As described herein, instructions may refer to specific configurations of hardware such as application specific integrated circuits (ASICs) configured to perform certain operations or having a predetermined functionality or software instructions stored in memory embodied in a non-transitory computer readable medium. Thus, the techniques shown in the figures can be implemented using code and data stored and executed on one or more electronic devices (e.g., an end station, a network element, etc.). Such electronic devices store and communicate (internally and/or with other electronic devices over a network) code and data using computer machine-readable media, such as non-transitory computer machine-readable storage media (e.g., magnetic disks; optical disks; random access memory; read only memory; flash memory devices; phase-change memory) and transitory computer machine-readable communication media (e.g., electrical, optical, acoustical or other form of propagated signals—such as carrier waves, infrared signals, digital signals, etc.).

In addition, such electronic devices typically include a set of one or more processors coupled to one or more other components, such as one or more storage devices (non-transitory machine-readable storage media), user input/output devices (e.g., a keyboard, a touchscreen, and/or a display), and network connections. The coupling of the set of processors and other components is typically through one or more busses and bridges (also termed as bus controllers). The storage device and signals carrying the network traffic respectively represent one or more machine-readable storage media and machine-readable communication media. Thus, the storage device of a given electronic device typically stores code and/or data for execution on the set of one or more processors of that electronic device. Of course, one or more parts of an embodiment of the invention may be implemented using different combinations of software, firmware, and/or hardware. Throughout this detailed description, for the purposes of explanation, numerous specific details were set forth in order to provide a thorough understanding of the present invention. It will be apparent, however, to one skilled in the art that the invention may be practiced without some of these specific details. In certain instances, well known structures and functions were not described in elaborate detail in order to avoid obscuring the subject matter of the present invention. Accordingly, the scope and spirit of the invention should be judged in terms of the claims which follow.

What is claimed is:

1. An apparatus comprising:
a graphics processing unit or general purpose processing unit comprising a plurality of execution units (EUs);
the EUs comprising decompression circuitry to decompress bounding volume hierarchy (BVH) data, the decompression circuitry comprising:
a shift unit to shift a designated amount of quantized min and/or max-values in accordance with a first set of bits that indicate what value is needed to extract from the min and/or max-values, wherein N bits are output from the shift unit;
an invert unit to invert the N bits if the first set of bits indicate that a decompressed max value is to be computed or pass through the N bits if the first set of bits indicate that a decompressed min value is to be computed;
a multiplication unit to multiply the N bits with a scale value to generate a multiplication result; and
an addition unit to add the multiplication result with a minimum value associated with a parent node in the BVH, resulting in either a decompressed min value or a decompressed max value.

2. The apparatus as in claim 1 wherein the multiplication unit comprises a 32 bit x N bit multiplication unit.

3. The apparatus as in claim 2 wherein the minimum value associated with the parent node comprises a 32-bit value.

4. The apparatus as in claim 1 wherein the decompression circuitry is to decompress BVH nodes responsive to a decompression instruction.

5. The apparatus as in claim 4 wherein the decompression instruction comprises a result operand indicating that either a min value or a max value is needed, a scale value for the dimension to decompress, the minimum value associated with the parent node for the dimension to decompress, quantized min and/or max values, and the first set of bits that indicate what value is needed to extract from the quantized min and/or max values.

6. A method to decompress bounding volume hierarchy (BVH) data, wherein the decompressing is performed by a plurality of execution units (EUs) within a graphics processing unit or general purpose processing unit, comprising:
shifting a designated amount of quantized min and/or max-values in accordance with a first set of bits that indicate what value is needed to extract from the min and/or max-values, wherein N bits are output from a shift unit;

inverting the N bits if the first set of bits indicate that a decompressed max value is to be computed or passing through the N bits if the first set of bits indicate that a decompressed min value is to be computed;

multiplying the N bits with a scale value to generate a multiplication result by a multiplication unit; and adding the multiplication result with a minimum value associated with a parent node in the BVH, resulting in either a decompressed min value or a decompressed max value.

7. The method of claim 6 wherein the multiplication unit comprises a 32 bit x N bit multiplication unit.

8. The method of claim 7 wherein the minimum value associated with the parent node comprises a 32-bit value.

9. The method of claim 6 wherein the decompressing BVH data is responsive to a decompression instruction.

10. The method of claim 9 wherein the decompression instruction comprises a result operand indicating that either a min value or a max value is needed, a scale value for the dimension to decompress, the minimum value associated with the parent node for the dimension to decompress, quantized min and/or max values, and the first set of bits that indicate what value is needed to extract from the quantized min and/or max values.

11. A non-transitory machine-readable storage medium including program code, which when executed by a graphics processing unit or general purpose processing unit, causes a plurality of execution units (EUs) within the graphics processing unit or general purpose processing unit to decompress bounding volume hierarchy (BVH) data, the decompressing comprising:

shifting a designated amount of quantized min and/or max-values in accordance with a first set of bits that indicate what value is needed to extract from the min and/or max-values, wherein N bits are output from a shift unit;

inverting the N bits if the first set of bits indicate that a decompressed max value is to be computed or passing through the N bits if the first set of bits indicate that a decompressed min value is to be computed;

multiplying the N bits with a scale value to generate a multiplication result by a multiplication unit; and adding the multiplication result with a minimum value associated with a parent node in the BVH, resulting in either a decompressed min value or a decompressed max value.

12. The non-transitory machine-readable medium of claim 11 wherein the multiplication unit comprises a 32 bit x N bit multiplication unit.

13. The non-transitory machine-readable medium of claim 12 wherein the minimum value associated with the parent node comprises a 32-bit value.

14. The non-transitory machine-readable medium of claim 11 wherein the decompressing BVH data is responsive to a decompression instruction.

15. The non-transitory machine-readable medium of claim 14 wherein the decompression instruction comprises a result operand indicating that either a min value or a max value is needed, a scale value for the dimension to decompress, the minimum value associated with the parent node for the dimension to decompress, quantized min and/or max values, and the first set of bits that indicate what value is needed to extract from the quantized min and/or max values.

* * * * *